US008409415B2

(12) United States Patent
Liu et al.

(10) Patent No.: US 8,409,415 B2
(45) Date of Patent: Apr. 2, 2013

(54) MANIPULATION OF MAGNETIC OR MAGNETIZABLE OBJECTS USING MAGNETOPHORESIS AND DIELECTROPHORESIS

(75) Inventors: Chengxun Liu, Leuven (BE); Liesbet Lagae, Herent (BE)

(73) Assignee: IMEC, Leuven (BE)

( * ) Notice: Subject to any disclaimer, the term of this patent is extended or adjusted under 35 U.S.C. 154(b) by 1561 days.

(21) Appl. No.: 11/844,171

(22) Filed: Aug. 23, 2007

(65) Prior Publication Data

US 2013/0043132 A1 Feb. 21, 2013

Related U.S. Application Data

(60) Provisional application No. 60/854,667, filed on Oct. 26, 2006.

(30) Foreign Application Priority Data

Mar. 22, 2007 (EP) .................................... 07005890

(51) Int. Cl.
*G01N 27/447* (2006.01)
*G01N 27/453* (2006.01)

(52) U.S. Cl. ....................................... 204/547; 204/643

(58) Field of Classification Search .................. 204/547, 204/643; 326/82

See application file for complete search history.

(56) References Cited

U.S. PATENT DOCUMENTS

| | | | | |
|---|---|---|---|---|
| 5,454,472 | A | 10/1995 | Benecke et al. | |
| 6,355,491 | B1 * | 3/2002 | Zhou et al. | 436/518 |
| 7,033,473 | B2 * | 4/2006 | Gascoyne et al. | 204/547 |
| 2002/0036141 | A1 * | 3/2002 | Gascoyne et al. | 204/547 |
| 2002/0036142 | A1 | 3/2002 | Gascoyne et al. | |

FOREIGN PATENT DOCUMENTS

| | | |
|---|---|---|
| WO | WO 94/16821 | 8/1994 |
| WO | WO 01/96857 | 12/2001 |
| WO | WO 02/28523 | 4/2002 |

OTHER PUBLICATIONS

"Timeline:50 Years of Hard Drives," by Rex Farrance, PCWorld, Sep. 13, 2006.*

European Search Report for EP 07 00 5890 dated Jul. 10, 2007.

* cited by examiner

*Primary Examiner* — Alex Noguerola

(74) *Attorney, Agent, or Firm* — Knobbe Martens Olson & Bear LLP

(57) ABSTRACT

A device for manipulating magnetic or magnetizable objects in a medium is provided. The device has a surface lying in a plane and comprises a set of at least two conductors electrically isolated from each other, wherein the at least two conductors are adapted for both generating a magnetophoresis force for moving the magnetic or magnetizable objects over the surface of the device in a direction substantially parallel to the plane of the surface, and generating a dielectrophoresis force for moving the magnetic or magnetizable objects in a direction substantially perpendicular to the plane of the surface. Also provided is a method for manipulating magnetic or magnetizable objects in a medium. The method uses a combined magnetophoresis and dielectrophoresis actuation principle for controlling in-plane as well as out-of-plane movement of the magnetic or magnetizable objects.

25 Claims, 20 Drawing Sheets

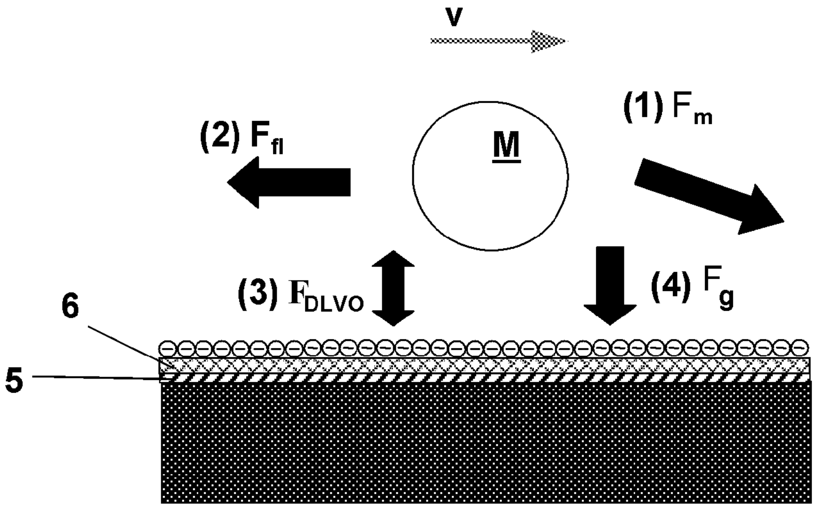
FIG. 1 – PRIOR ART
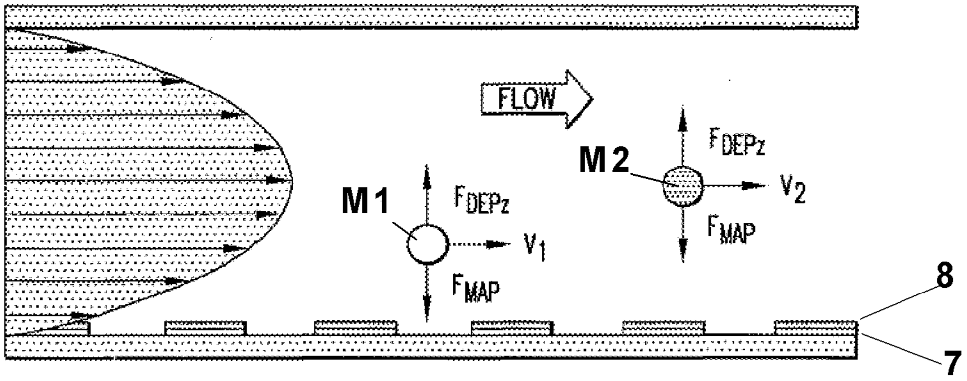
FIG. 2 – PRIOR ART

MANIPULATION OF MAGNETIC OR MAGNETIZABLE OBJECTS USING MAGNETOPHORESIS AND DIELECTROPHORESIS

CROSS-REFERENCE TO RELATED APPLICATIONS

This application claims the benefit under 35 U.S.C. §119 (e) of U.S. provisional application Ser. No. 60/854,667 filed Oct. 26, 2006, and claims the benefit under 35 U.S.C. §119 (a)-(d) of European application No. EP 07005890.4 filed Mar. 22, 2007, the disclosures of which are hereby expressly incorporated by reference in their entirety and are hereby expressly made a portion of this application.

FIELD OF THE INVENTION

A device and a method for the manipulation of magnetic or magnetizable objects in a sample fluid is provided. More particularly, a device and a method for manipulation of magnetic or magnetizable objects using combined magnetophoresis and dielectrophoresis is provided. The method according to preferred embodiments can be combined with detecting the presence and/or determining the concentration of magnetic or magnetizable objects in a sample fluid.

BACKGROUND OF THE INVENTION

The concept Lab-on-a-chip (LOC) emerged at the beginning of 1990's. Three phases of a biomedical assay are incorporated into LOC devices, i.e. sample pre-treatment, biochemical reaction, and signal detection. Lab-on-chip microsystems may have the following advantages:

- They require much smaller sample quantities than traditional wet-bench laboratory work.
- Many biochemical reactions can take place in parallel with high automation and reproducibility.
- The increased dynamic chemical performance due to the increased surface-to-volume ratio in microsystems speeds up the bio-assay process to a great extent.
- As the biochemical reactions perform in a closed system without direct manual operations, contamination and uncertainty can be reduced.

However, scaling down such LOC systems may not be straightforward. One of the new challenges is the transport of the sample (bio-analytes, e.g. cells or bio-molecules, in aqueous buffer) between different functional compartments of the system. In microsystems, it is more difficult to carry the bio-analytes simply by a fluid flow because traditional actuation forces (e.g. mechanical force, electro-osmotic force, acoustic force) significantly decrease as the system feature sizes scale down. As a result, the active actuation forces become less important when compared to resistive forces (e.g. surface tension) or fluctuations in the system.

Magnetic particles may be used in lab-on-a-chip systems for cell separation, magnetic bio-assay, and other applications. Target bio-analytes (e.g. bio-molecules or cells) can be specifically captured by functionalized magnetic particles and then be attracted or transported by on-chip electrically controllable electromagnetic fields.

An alternative method for sample transfer is to transport the bio-analytes without moving the fluid. This can be achieved by different approaches such as dielectrophoresis and magnetophoresis.

Dielectrophoresis (DEP) is a very effective method for particle manipulation and separation. This technique is usually applied to cells, cell organelles or other particles (e.g. cell content and its membrane). If a particle is subjected to an electric field, charges will be induced due to the relative permittivity and conductivity of the particle when compared to the medium. This process is called polarization. The particle can be driven by the electrostatic force if the external electric field is non-uniform. Particularly in an AC electric field, the particle polarization is frequency dependent, i.e. the polarity and strength can be adjusted by changing the frequency and amplitude of the AC electric field. As a result, the induced force and hence the movement of the particle can be adjusted. This is called dielectrophoresis (DEP). By changing the induced force, the particle can be attracted or repelled by conventional DEP or moved bi-directionally by traveling wave DEP. DEP can also be used to identify or separate different particles (e.g. different types of bacterium, living or dead cells). The main advantage of DEP is that the actuating force, and hence the motion style, can be controlled by a simple electric field.

However, there are also disadvantages to DEP. The DEP performance is highly sensitive to the fluid, e.g. buffer, especially ion strength. A large DEP force can only be obtained in a medium with low ionic strength whereas the ionic strength of real samples such as e.g. blood is higher by several orders of magnitude. Furthermore, as the DEP force amplitude is roughly proportional to the volume of the particle, it is only suitable for the manipulation of large particles, e.g. cells, but it is too small for small molecules. In addition, the DEP of bio-analytes is a physical effect which does not necessarily reflect the biological property of the analyte. Therefore, it could be difficult to manipulate the analyte with certain specificity in a complicated environment.

There have been quite a few examples of DEP manipulation of bio-analytes. For example, different moieties in a medium can be separated from each other because of their different DEP properties (see, e.g., US 2003/047456, US 2004/653020, U.S. Pat. No. 6,858,439). By carefully selecting the DEP frequency, the target component can be trapped by a positive DEP force while all other components are not captured. Furthermore, traveling wave DEP can separate different moieties as well (U.S. Pat. No. 6,596,143, US 2001/045359).

Another method for bio-analyte transport is to use magnetic particles as carriers. Functionalized magnetic particles have been used for target bio-analyte separation for years. In microfluidic systems, magnetic particles can be actuated by a magnetic force. When the magnetic particles are attached to target bio-analytes, the bio-analytes can be transported together with the magnetic particles. This method is called magnetophoresis (MAP). Different approaches were reported to generate magnetic fields for particle transport.

The magnetic field can be applied by external magnets. When the fluid carries the magnetic particles, the magnetic particles bound to the bio-analyte will be attracted towards the magnet(s) and can be separated from other components in the medium. Particularly, by making use of different mobility of different magnetically labeled bio-analytes, the target bio-analytes can be separated from other components (see U.S. Pat. No. 6,467,630).

Alternatively, especially in microsystems, the magnetic field can be applied with microfabricated electromagnets (see US 2004/262210). In this case, the micro electromagnets are current-carrying micro-conductors. The current sent through these conductors generates a local magnetic field which is able to attract and/or continuously move the magnetic particles and, hence, the bio-analytes bound to the particles (see US 2002/166800, EP 1462174).

An advantage of MAP is the fact that it keeps the bio-specificity due to the bio-affinitive binding between the magnetic particle and the bio-analyte. Another advantage is that the magnetic force applied to the bio-analyte does not depend on the size of the analyte but is only determined by the magnetic particle and the applied magnetic field. Still another advantage is that the magnetic force is not affected by the medium as most media do not contain any magnetic component. Meanwhile, the possibility of integrating magnetic sensors, e.g. magnetoresistive sensors, in a microsystem can easily feature the system with detection functionality, which is very useful for lab-on-a-chip applications.

Despite these magnetic particle transport mechanisms, there is still a serious problem for transport of e.g. bio-analytes in particular applications. FIG. 1 schematically illustrates forces exerted to a magnetic particle M in a medium flowing over a substrate in a magnetic field. The forces experienced by the magnetic particle M are (1) a magnetic force ($F_m$), (2) a force ($F_{fl}$) exerted by the fluid on the magnetic particle M, (3) a Derjaguin-Landau-Verwey-Overbeek force ($F_{DVLO}$) and (4) gravity ($F_g$). For inducing a magnetic field, a conductor 5 covered by a dielectric layer 6, also called passivation layer, may be included in the substrate. As most magnetic particles M for biological applications are super-paramagnetic or paramagnetic, the magnetic particles M move to the place where the magnetic field is stronger. Therefore, when the magnetic field is generated by an on-chip electromagnet, the magnetic force (1) ($F_m$) always attracts the magnetic particle M towards the substrate. Depending of the orientation of the substrate, also the gravity (4) ($F_g$) can attract the magnetic particle M towards the substrate. Meanwhile, if the magnetic particle M is close enough to the solid substrate, the Derjaguin-Landau-Verwey-Overbeek (DLVO) interaction between the magnetic particle M and the substrate surface becomes significant. The DLVO interaction includes the effect of Van der Waals attraction and electrostatic interaction. The DLVO force (3) ($F_{DVLO}$) can be attractive or repulsive depending on the material the magnetic particle M is formed of and the material of the substrate surface as well as the pH and ionic strength of the medium. If the DLVO force (3) ($F_{DVLO}$) is repulsive and is large enough, it could balance the attractive out-of-plane component of the magnetic force (1) ($F_m$) so that the magnetic particle M is kept levitated in the medium. However, if the repulsive DLVO force (3) ($F_{DVLO}$) is not strong enough or if the DLVO force (3) ($F_{DVLO}$) is attractive, the magnetic particle M will be brought to the substrate surface by the sum of DLVO force (3) ($F_{DVLO}$) and the magnetic force (1) ($F_m$) until it finally gets in contact with the substrate. Once the magnetic particle M adheres to the substrate surface, it becomes difficult to move the magnetic particle M by the magnetic field or the force exerted by the fluid on the magnetic particle M (2) ($F_{fl}$).

In order to avoid the adhesion problem, surfactants can be added to the medium in order to fully charge the surface of both magnetic particles M and the substrate surface. As a result, a large repulsive DLVO force (3) ($F_{DVLO}$) can be obtained. However, the use of surfactants is rather restricted in practical biochemical reactions, especially with cells. In most biochemical operations, the DLVO force (3) ($F_{DVLO}$) can be very small mainly due to the neutral pH and high ionic strength. In addition, it is not always opportune to change the medium arbitrarily and thus the DLVO force (3) ($F_{DVLO}$) cannot be used to balance the attractive magnetic force (1) ($F_m$). This problem can seriously affect the application of magnetic particles M as bio-analyte carriers in lab-on-a-chip systems.

A more powerful but more complex approach could be the combination of different physical forces for bio-analyte manipulation. These forces can be DEP force, magnetic force and/or acoustic force.

The combination of a magnetic force and a negative dielectrophoretic force for selectively separating target bio-analytes with magnetic particles was described in WO 2001/96857 and is illustrated in FIG. 2. Fabricated magnetrodes 7 (micro-magnetic structures) apply magnetic forces to the magnetic particles M1 and M2 carried by the fluid. In the mean time, an AC electric field is also applied to the particles M1 and M2 by electrodes 8 on top of the magnetrodes 7 to induce a negative dielectrophoresis. The repulsive DEP force balances the attractive magnetic force at a certain separation distance (the distance between the particles M1 and M2 and the device). Consequently, magnetic particles M1 and M2 with different magnetic and DEP properties can be levitated at a different separation distance, and hence they can be separated from each other by the fluid flow. Although in this example the separation distance of the magnetic particles M1 and M2 can be controlled by the balance of the magnetic force and the DEP force, this approach is not capable of actively transporting the magnetic particles M1 and M2 by traveling micro-electromagnetic fields. Instead the magnetic particles M1 and M2 are still carried by the fluid. The magnetic force is applied on the magnetic particles M1 and M2 by pre-deposited magnetrodes 7 (in an external magnetic field when necessary).

SUMMARY OF THE INVENTION

A device and method for manipulation of magnetic or magnetizable objects is provided.

The device and method according to preferred embodiments prevent the adhesion of magnetic or magnetizable objects to the substrate and allows moving the magnetic or magnetizable objects, both by using a same set of conductors. With the method and device according to preferred embodiments, the distance of a magnetic or magnetizable object from a substrate and movement of magnetic or magnetizable objects in a pre-defined direction can be controlled.

By requiring only one set of conductors for both generating a magnetophoresis and dielectrophoresis force, the number of conductors in the device can be kept low and thus the device sizes can be minimized which is important in view of miniaturization of devices.

With manipulation of magnetic or magnetizable objects is meant transport of magnetic or magnetizable objects, active mixing of different types of magnetic or magnetizable objects, separation of different types of magnetic or magnetizable objects from each other, attracting and repelling magnetic or magnetizable objects to and from a surface of a device.

The device and method according to preferred embodiments can also be used to combine manipulation of magnetic or magnetizable objects with detection of the presence and/or determination of the concentration of magnetic or magnetizable objects in a sample fluid.

Furthermore, the preferred embodiments relate to a device and a method for manipulating biological or chemical species bound to magnetic or magnetizable objects using magnetic fields in microfluidic applications.

The above objectives can be accomplished by a method and device according to the preferred embodiments.

In a first aspect, a device is provided for manipulating magnetic or magnetizable objects in a medium, the device having a surface lying in a plane and comprising a set of at least two conductors electrically isolated from each other, wherein the at least two conductors are configured to generate a magnetophoresis force to move the magnetic or magnetizable objects over the surface of the device in a direction substantially parallel to the plane of the surface, and to generate a dielectrophoresis force to move the magnetic or magnetizable objects in a direction substantially perpendicular to the plane of the surface.

In an embodiment of the first aspect, the at least two conductors at least partly overlap with each other.

In an embodiment of the first aspect, the at least two conductors comprise a different conductive layer at least at locations where the conductors overlap.

In an embodiment of the first aspect, the conductive layers are located at a different height in a substrate of the device with respect to the surface of the device.

In an embodiment of the first aspect, each of the conductors has a shape of a meander.

In an embodiment of the first aspect, the meander has long lines and short lines configured to connect the long lines, wherein the long lines are substantially parallel to each other and substantially perpendicular to the short lines.

In an embodiment of the first aspect, each of the conductors has a substantially circular shape.

In an embodiment of the first aspect, the at least two conductors comprise a material selected from the group consisting of Cu, Al, Au, Pt, Ti, and alloys thereof.

In an embodiment of the first aspect, at least a part of at least one conductor comprises a magnetic material.

In an embodiment of the first aspect, the device further comprises at least one detector configured to perform at least one of detecting a presence of magnetic or magnetizable objects in a medium and determining a concentration of magnetic or magnetizable objects in a medium.

In an embodiment of the first aspect, the at least one detector is a sensor and is selected from the group consisting of an optical sensor, an electrical sensor, a chemical sensor, a thermal sensor, an acoustic sensor, and a magnetic sensor.

In an embodiment of the first aspect, the at least one detector is part of a feedback loop configured to control transport of the magnetic or magnetizable objects using at least one signal recorded by the at least one detector.

In an embodiment of the first aspect, the magnetic or magnetizable objects are magnetic particles and comprise a material selected from the group consisting of Fe, Co, Ni, Mn, oxides thereof, and alloys thereof.

In an embodiment of the first aspect, the magnetic or magnetizable objects are biochemically functionalized to bind at least one target bio-analyte.

In an embodiment of the first aspect, the device further comprises a bio-functionalized layer on the surface to bind at least one target bio-analyte.

In a second aspect, a method is provided comprising the step of using the device of the first aspect to perform at least one of detecting a presence of at least one bio-analyte in a sample fluid and determining a concentration of at least one bio-analyte in a sample fluid.

In a third aspect, a method is provided for manipulating magnetic or magnetizable objects in a medium, the method comprising providing a medium comprising magnetic or magnetizable objects to a device having a surface, the device comprising a set of at least two conductors electrically isolated from each other; applying a DC-current through each of the at least two conductors whereby a magnetophoresis force is generated to move the magnetic or magnetizable objects over the surface of the device in a direction substantially parallel to a plane of the surface; and simultaneously applying an AC-voltage across the at least two conductors, whereby a dielectrophoresis force is generated to move the magnetic or magnetizable objects in a direction substantially perpendicular to the plane of the surface.

In an embodiment of the third aspect, applying a DC-current through each of the at least two conductors whereby a magnetophoresis force is generated comprises alternately applying a DC-current through each of the at least two conductors.

In an embodiment of the third aspect, the device comprises a set of a first conductor and a second conductor, wherein the first conductor and the second conductor at least partially overlap each other, and wherein alternately sending a DC-current through each of the at least two conductors is performed by applying a DC current to the first conductor in a first direction; thereafter applying a DC current to the second conductor in the first direction; thereafter applying a DC current to the first conductor in a second direction opposite to the first direction; and thereafter applying a DC current to the second conductor in the second direction opposite to the first direction.

In an embodiment of the third aspect, the method further comprises repeating steps a to d at least once.

In an embodiment of the third aspect, the medium comprises different types of magnetic or magnetizable objects, and wherein the method further comprises separating the different types of magnetic or magnetizable particles from each other.

In an embodiment of the third aspect, the device further comprises at least one detector, wherein the method further comprises performing at least one of detecting a presence of the magnetic or magnetizable objects using the at least one detector and determining a concentration of the magnetic or magnetizable objects using the at least one detector.

In an embodiment of the third aspect, the method further comprises, after detecting the presence of the magnetic or magnetizable objects, sending at least one signal recorded by the at least one detector to a feedback loop configured to control transport of the magnetic or magnetizable objects.

In an embodiment of the third aspect, the method further comprises chemically or physically binding the magnetic or magnetizable objects to at least one bio-analyte to be detected.

In an embodiment of the third aspect, the method further comprises applying an external magnetic field.

In a fourth aspect, a controller is provided for controlling a current flowing through each of at least two electrically isolated conductors of a device for manipulating magnetic or magnetizable objects in a medium, the controller comprising a control unit for controlling a current source configured to apply a current through each of the at least two conductors of the device.

In an embodiment of the fourth aspect, the control unit is configured to control the current source configured to apply a current alternately through each of the at least two conductors.

In a fifth aspect, a computer program product is provided that is configured to perform, when executed on a computing means, the method of the fourth aspect.

In a sixth aspect, a machine readable data storage device is provided that is configured to store the computer program product of the fifth aspect.

In a seventh aspect, a method is provided comprising transmitting the computer program product of fifth aspect over a local or wide area telecommunications network.

Particular and preferred aspects of the preferred embodiments are set out in the accompanying independent and dependent claims. Features from the dependent claims can be combined with features of the independent claims and with features of other dependent claims as appropriate and not merely as explicitly set out in the claims.

Although there have been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the preferred embodiments will become apparent from the following detailed description, taken in conjunction with the accompanying drawings, which illustrate, by way of example, the principles of the preferred embodiments. This description is given for the sake of example only, without limiting the scope of the preferred embodiments. The reference figures quoted below refer to the attached drawings.

BRIEF DESCRIPTION OF THE DRAWINGS

FIG. 1 schematically illustrates forces exerted on a magnetic particle in a typical magnetophoresis experiment.

FIG. 2 illustrates the magnetic particle levitation principle of WO 2001/96857A2.

Figure 3:
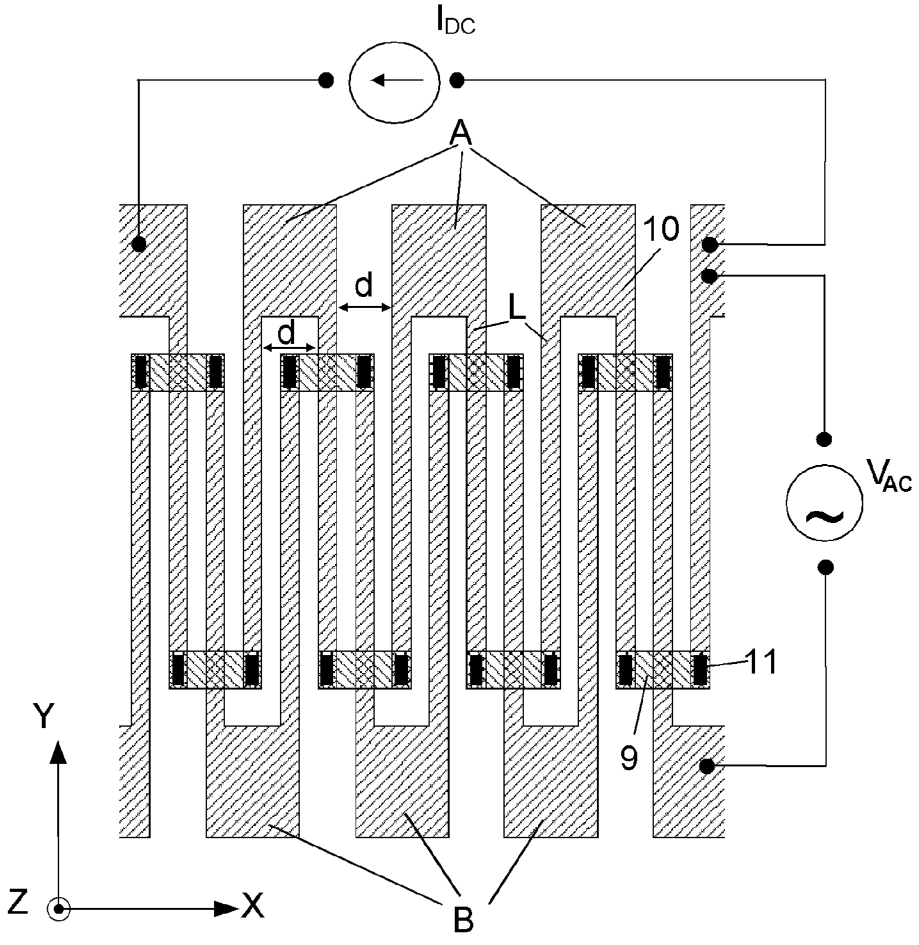
FIG. 3 schematically illustrates a device according to a preferred embodiment.

In the different figures, the same reference signs refer to the same or analogous elements.

DETAILED DESCRIPTION OF THE PREFERRED EMBODIMENT

The present invention will be described with respect to preferred embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments described herein can operate in other orientations than described or illustrated herein.

The term “comprising”, used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression “a device comprising means A and B” should not be limited to devices consisting only of components A and B. It means that with respect to the preferred embodiments, the only relevant components of the device are A and B.

Reference throughout this specification to “one embodiment” or “an embodiment” means that a particular feature, structure or characteristic described in connection with the embodiment is included in at least one embodiment of the present invention. Thus, appearances of the phrases “in one embodiment” or “in an embodiment” in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary preferred embodiments, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that preferred embodiments may be practised without these specific details. In other instances, well-known methods, structures and techniques have not been shown in detail in order not to obscure an understanding of this description.

The preferred embodiments relate to a method and device for manipulation of magnetic or magnetizable objects in a fluid. In order to control both in-plane and out-of-plane movement of magnetic or magnetizable objects in a fluid, the preferred embodiments relate to a device and method based on a combination of magnetophoresis (MAP) and dielectrophoresis (DEP). A novel device and method for manipulation of magnetic or magnetizable objects or of a complex of magnetic or magnetizable objects and bio-analytes are provided.

The device and method according to preferred embodiments can prevent adhesion of magnetic or magnetizable objects on a substrate of the device and allows moving the magnetic or magnetizable objects using a same set of conductors. Hence, the device and method according to preferred embodiments allow controlling in-plane and out-of-plane movements of magnetic or magnetizable particles thereby requiring only a limited number of conductors. The in-plane movement may also be referred to as transport plane, because it is the plane in which the magnetic or magnetizable objects are moved over a surface of the device. The movement of magnetic or magnetizable objects can be controlled bi-directionally in the transport plane or in-plane and out of the transport plane simply by controlling the direction of the current sent through the conductors.

The magnetic or magnetizable objects may preferably be magnetic particles, but may also be any other suitable magnetic or magnetizable objects which can be attached to e.g. bio-analytes. The magnetic or magnetizable objects may include any suitable form of one or more magnetic particles or magnetizable particles e.g. magnetic, diamagnetic, paramagnetic, superparamagnetic, ferromagnetic, that is any form of magnetism which generates a magnetic moment in a magnetic field, either permanently or temporarily.

The preferred embodiments also apply to a magnetic or magnetizable object being a magnetic rod, a string of magnetic particles, or a composite particle, e.g. a particle containing magnetic as well as non-magnetic material, for example optically-active material, or magnetic material inside a non-magnetic matrix.

The preferred embodiments will be described by means of magnetic particles. This is only for the ease of explanation and it does not limit the preferred embodiments in any way. According to preferred embodiments, magnetic particles refer to any particles ranging from a few nanometers to a few hundreds of micrometers.

The magnetic materials for forming the magnetic particles may comprise iron, cobalt, nickel, manganese, platinum, their oxides and/or alloys with other metals, and other materials which exhibit ferromagnetism, ferrimagnetism, antiferromagnetism or paramagnetism at room temperatures. Besides the magnetic materials, magnetic particles may often comprise non-magnetic materials, such as latex, silica, polystyrene, etc. These non-magnetic materials serve as a matrix in which small magnetic nanoparticles with a diameter of a few nanometers to a few tens of nanometers can be dispersed or positioned at the center of the whole particle.

According to preferred embodiments, the magnetic particle can be modified with non-magnetic materials, e.g. a magnetic shell with a non-magnetic coating, in order to gain extra functionalities in addition to magnetism. The non-magnetic materials may, for example, be gold, silver, carbon, conducting polymer, etc. The coatings can, for example, facilitate binding of molecules to the particle surface. The magnetic particles could also be hybrid particles composed of at least one magnetic particle and at least one non-magnetic particle with different functions. These non-magnetic particles may, for example, include gold particles, silver particles, carbon particles, quantum dots, conducting polymers, etc. Magnetic particles often show superparamagnetism at room temperature.

The surface of the magnetic particles may be biochemically functionalized in order to bind the target bio-analytes. In terms of transport, the manipulation of bio-analytes bound to magnetic particles and the magnetic particles themselves may be the same. Therefore, any actuation principle for magnetic particles could be applied to bio-analyte bound to the magnetic particle. The preferred embodiments will be described by means of magnetic particles only. It is, however, to be understood that all embodiments which will be described hereinafter also apply to magnetic particles bound to target analytes and that the method according to preferred embodiments thus may also be applied for manipulating the movement of magnetic particles bound to bio-analytes.

According to preferred embodiments, if the bio-analyte itself is paramagnetic, ferromagnetic or ferrimagnetic, the bio-analyte itself can be seen as the magnetic particles and thus the method according to preferred embodiments may also be used to manipulate the bio-analyte in a sample fluid.

Thus, a device and method for manipulating magnetic particles in a medium, e.g. a sample fluid, is provided according to the preferred embodiments.

The device for manipulating magnetic particles in a medium according to the preferred embodiments has a surface lying in a plane and comprises a set of at least two conductors electrically isolated from each other. According to the preferred embodiments, the at least two conductors are adapted both for generating a magnetophoresis (MAP) force for moving the magnetic particles over the surface of the device in a direction substantially parallel to the plane of the surface and for generating a dielectrophoresis (DEP) force for moving the magnetic particles in a direction substantially perpendicular to the plane of the surface.

The method for manipulating magnetic particles in a medium according to the preferred embodiments comprises:

providing the medium comprising the magnetic particles to a device having a surface and comprising a set of at least two conductors electrically isolated from each other, applying a DC-current, e.g. alternately applying a DC-current, through the at least two conductors for generating a magnetophoresis (MAP) force for moving the magnetic particles over the surface of the device in a direction substantially parallel to the plane of the surface, and simultaneously applying an AC-voltage across the at least two conductors for generating a dielectrophoresis (DEP) force for moving the magnetic particles in a direction substantially perpendicular to the plane of the surface.

With manipulating magnetic particles is meant transport of magnetic particles, active mixing of different types of magnetic particles, separating of different types of magnetic particles from each other, attracting and repelling magnetic particles to and from a surface of the device.

With alternately applying a DC current is meant that for generating magnetophoresis (MAP) forces a DC current is applied to each of the conductors one after another. Preferably current is not applied to two different conductors at the same time; however, the preferred embodiments are not limited thereto. With simultaneously applying an AC voltage is meant that for generating a dielectrophoresis (DEP) force an AC voltage is applied across the conductors, preferably across all the conductors, at the same time as the DC current is sent, e.g. alternately sent, through the at least two conductors, i.e. the AC voltage is applied to conductors to which a current is applied as well as to the ones to which no current is applied at that moment in time.

An advantage of the preferred embodiments is that a same set of conductors is used for both controlling in-plane and out-of-plane movement of the magnetic particles. Hence, the number of conductors in the device can be kept low and thus the device sizes can be minimized which is important in view of miniaturization of devices. Furthermore, keeping the number of conductors in the device low reduces the complexity of the fabrication process . . . . The magnitude of the applied MAP and DEP forces can be easily tuned by adjusting the DC current through the conductors in case of MAP and by adjusting the AC voltage across the conductors in case of DEP. Instead of using two different entities i.e. one for in-plane movement of the magnetic particles and one for out-of-plane movement of the magnetic particles, for example for separating magnetic particles with different physical, chemical, or biochemical properties, the same set of conductors may be used both for moving the particles in-plane and out-of-plane.

In contrast, in prior art devices (e.g. the device of WO 2001/96857) the need may arise to change the physical parameters such as material, length, width or thickness of the magnetrodes, during device fabrication in order to obtain control over the MAP and/or DEP forces. Hence, once the device is manufactured, it cannot be changed anymore.

Another advantage of the device according to preferred embodiments is that by including the conductors in or on the substrate, no extra external entity is needed, thereby reducing the size of the device.

Furthermore, sensing units can be included in or on the substrate. Even the conductors, or at least part of one of the conductors, can be used for sensing purposes, again reducing the complexity, the size and the cost of the device.

The medium, e.g. sample fluid, in which magnetic particles have to be transported is often an aqueous solution such as water, phosphate buffered saline (PBS) with or without additional additives (e.g. bovine serum albumin (BSA), KCl, NaCl, antibiotics, etc.), cell culture medium (RPMI series medium, Minimum Essential Medium based medium), human serum, etc. The medium may, according to embodiments, comprise target bio-analytes which have to transported, mixed, detected, etc. . . . These target bio-analytes may, according to some embodiments, for example, be molecular species, cell fragments, viruses, etc.

According to preferred embodiments, a magnetic field is used for in-plane magnetic particle actuation. This means that a magnetic field is used for transporting magnetic particles over a surface of the device. This magnetic field will also be referred to as traveling magnetic field. The traveling magnetic field may be generated by a set of electrodes or conductors, for example a set of at least two meandering electrodes. This driving force for the transport of the magnetic particles is also referred to as magnetophoresis (MAP). According to the preferred embodiments, an additional negative dielectrophoresis (DEP) force is built up by using a same set of electrodes or conductors as for generating the MAP force, for example a set of at least two meandering electrodes. The induced negative DEP force on the magnetic particles can be used to balance for particle gravity and the out-of-plane component of the magnetic force. Hence, a separation distance, i.e. a distance between the magnetic particle and a surface of the device, not only depends on the particle-surface Derjaguin-Landau-Verwey-Overbeek (DLVO) interaction, but can be electrically controlled by the DEP force. The method according to preferred embodiments improves transport of magnetic particles with more flexibility and reliability in lab-on-chip systems.

According to the preferred embodiments, both the DEP and MAP forces are generated by a same set of electrodes or conductors. This set of conductors comprises at least two conductors, a first and a second conductor, which are electrically isolated from each other. According to preferred embodiments, the set of electrodes or conductors may also comprise more than two electrodes or conductors, such as for example three or four electrodes or conductors, which are each electrically isolated from the other electrodes or conductors. According to preferred embodiments, these electrodes or conductors may partially or fully overlap.

For electrically isolating the different electrodes or conductors, the electrodes or conductors may be separated by insulating materials, e.g. by dielectric materials. According to preferred embodiments, the electrodes or conductors may be organized on or formed from one layer of conductive material, e.g. one metal layer, or conductive material level or at least one electrode or conductor may be localized at a different layer of conductive material, e.g. metal layer, in the substrate when compared to the other electrodes or conductors. According to other preferred embodiments, each individual electrode conductor can be localized in another layer of conductive material, e.g. metal layer, or conductive material level when compared to the other electrodes or conductors. Different parts of one electrode or conductor can be formed from different layers of conductive material, e.g. metal layers. In that case, these different parts need to be connected to form one continuous electrode or conductor. These parts of one electrode or conductor at different layers of conductive material, e.g. metal layers, can be connected by e.g. vias. Most preferably, these vias may be designed such that they do not limit the current running through the electrode conductors. For example, at points where the electrodes or conductors cross each other, a different layer of conductive material, e.g. metal layer can be chosen for part of at least one electrode or conductor. In between the different layers of conductive material, e.g. metal layers, there may be an insulating material, such as a dielectric material. This allows electrical isolation of the electrodes or conductors at locations where they cross each other. According to preferred embodiments, the different layers of conductive material, e.g. metal layers may be formed in a substrate of the device. According to other embodiments, however, at least one of the different layers of conductive material, e.g. metal layers, may be located on top of the substrate. For example, an upper layer of conductive material, e.g. a metal layer, can be located on top of the substrate.

The preferred embodiments will further be described by means of the conductive layers being metal layers. This is not intended to limit the preferred embodiments and it has to be understood that any other suitable conductive material may also be used to form the conductors. Where in the further description is referred to a different metal layer or metal level, this means that the electrodes or conductors run at a different locations or heights in the substrate.

According to preferred embodiments, the conductors may have the shape of meanders or may be meander-like electrodes or conductors. Each individual meander can run at one metal layer, but the meanders can also be located at different metal layers when compared to the other meanders. Alternatively, at least one of the meanders can run over at least two metal layers. This allows electrical insulation of the meanders by changing metal layer at locations where the meanders cross each other and by providing an insulating material in between the different metal layers.

FIG. 3 illustrates a device according to a preferred embodiment. The device may comprise a set of two electrodes or conductors A and B located in or on a substrate (not shown in the figure). Each of the two electrodes or conductors A and B may have the shape of a meander and will further be referred to as meanders A and B. According to the present embodiment, the two meanders A and B partially overlap with each other. The two meanders A and B are electrically isolated from each other by e.g. a dielectric material, such as $Si_3N_4$, and can be operated independently. According to the present embodiment, each of the meanders A and B may be formed of a first and second metal layer 9, 10. In the configuration illustrated in FIG. 3, long lines L of the meanders A and B which are substantially parallel to each other may be formed in the second metal layer 10. The parts of the meanders A and B which partly overlap with the other meander B and A may be formed in the first metal layer 9. These latter parts may be oriented in a direction substantially perpendicular to the direction of the parallel long lines L of the meanders A and B.

The first and second metal layer 9, 10 may be located at a different level in the substrate and may be connected to each other through vias 11. In FIG. 3, for each of the meanders A and B the first metal layer 9 is located at a lower level than the second metal layer 10. Or in other words, the second metal layer 10 is located above the first metal layer 9, closer to a medium, e.g. sample fluid comprising the magnetic particles to be manipulated. Hence, according to the present embodiment, the first and second metal layers 9, 10 are positioned at a different level.

In the embodiment illustrated in FIG. 3, the largest part of the meanders A and B is located in or formed from the second metal layer 10. At locations where the meanders A and B are crossing each other, parts of one of these meanders A or B are moved to the first metal layer 9, or in other words are formed on a different level than the second metal layer 10. Electrical connection between the different parts of one meander A or B, i.e. between the first and second metal layer 9, 10 forming the meander A or B may then be provided by vias 11. For some applications it may be beneficial to interchange the first and second metal layers 9, 10 or to form the biggest part of the meanders A and B in the first metal layer 9 instead of in the second metal layer 10 (see further).

Figure 4:
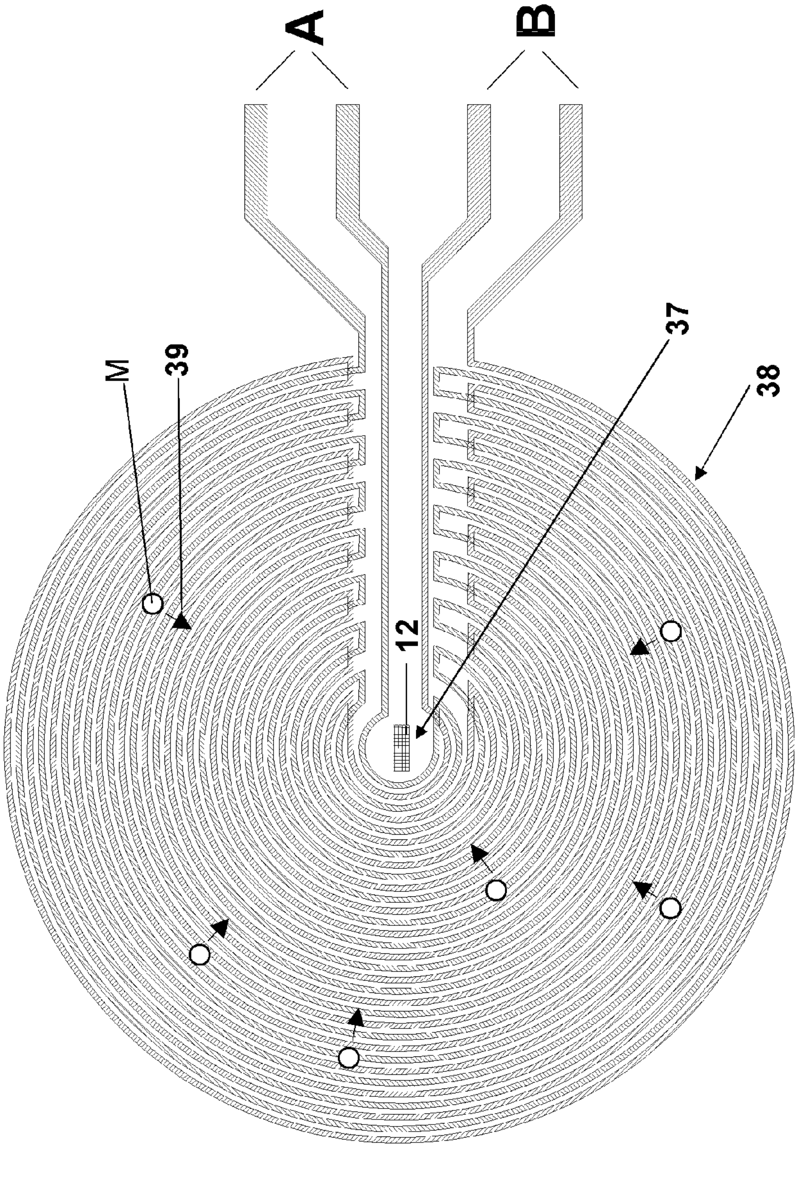
FIG. 4 illustrates a device according to a preferred embodiment.

In the embodiment illustrated in FIG. 3 the meanders A and B are located or comprised within a rectangular area and partially overlap with each other. According to this present embodiment, the distance d between the lines L of each of the meanders A or B may be the same. However, according to other preferred embodiments, the distance d between the lines L of each of the meanders A or B may also be different. The lines L of the meanders A and B can, instead of being straight as in the embodiment illustrated in FIG. 3, also have a curvature. For example, they can be included in a circular area, as is illustrated in FIG. 4. Instead of being straight or having a curvature, the lines L of the meanders A and B may also have other shapes, for example a combination of straight and curved portions. For example, they can be wide and bowed at the starting point, become narrower towards a straight end that finally ends at a detector or sensor 12. A schematic drawing is given in FIG. 25. The goal is to concentrate the magnetic particles M near the sensor 12 (see further). The area that is filled with the meanders A and B can, instead of being rectangular or circular, also have any other suitable shape.

The distance d between the lines L of the meanders A and B and the geometry in which the meanders A and B are comprised, may be chosen such that appropriate DEP and MAP forces can be generated to simultaneously move the magnetic particles out-of-plane at a predefined height from the surface of the substrate and to move the magnetic particles in-plane in a pre-defined direction. The direction in which the magnetic particles are moved in-plane may be substantially parallel to the surface of the substrate. This pre-defined direction can for example be in the direction of a detector 12 (see further). In FIG. 4, the detector 12 is located at the center 37 of the circular area. However, the detector 12 may, according to other embodiments and depending on the geometry of the meanders A and B also be located in other places, such as for example at the border 38 of the circular area (see further). The detector 12 may be for detecting the presence and/or determining the concentration of target bio-analytes in a sample fluid. The detector 12 may, for example, be a sensor for sensing the presence of magnetic or magnetized particles. According to particular embodiments, detectors 12, e.g. sensors, may be included in or on the substrate in, for example, a sensing layer (see further).

The resistivity of the meanders A and B can be chosen to achieve a certain resistance in the meanders A and B based on the line width and, if applicable, based on the size of the vias 11 connecting different parts of a meander A or B, as was discussed above. Preferably, the resistance of the meanders A and B and the capacitive coupling between the meanders A and B may preferably be low. In this way the thermal effect induced by the DC current sent through the meanders A or B as well as the RC delay for the AC signal or voltage over the meanders A and B can be kept low. The required resistance of the meanders A and B depends on the length of the meanders A and B. For example, a copper conductor with a length of 3360 μm and a width of 5 μm, may have a resistance of 20 to 30Ω.

According to preferred embodiments, the meanders A and B can be made of a conducting material such as metals (e.g. Cu, Al, Au, Pt, Ti or alloys thereof) or any other known suitable conducting material. The meanders A and B may also at least partly be formed of magnetic materials for sensing purposes (see further). In the latter case, the meanders A and B may then also perform the function of detector 12.

The insulating material in between the first and second metal layers 9, may be a dielectric material such as e.g. $SiO_2$, $Si_3N_4$, $Al_2O_3$, $Ta_2O_5$, polyimide, SU-8, or may be any other suitable material with insulating properties.

The width of the lines L of the meanders A and B may vary between 5 nm and 1 mm and may typically be 5 μm. The thickness of the meanders A and B may vary between 10 nm and 5000 nm, preferably between 50 nm and 2000 nm or more preferably between 100 nm and 1200 nm. The distance between the first and second metal layers 9, 10 may vary between 50 nm and 5000 nm, preferably between 100 nm and 2000 nm or more preferably between 300 and 600 nm, and may typically be 500 nm. The width and the length of the vias 11 may vary between 2 nm and 1 mm. The length of the vias 11 may typically be 8 μm and the width of the vias 11 may typically be 3 μm.

Hereinafter, the principle of combined magnetophoresis and dielectrophoresis will be described which will then further be explained by means of different preferred embodiments.

First, the principle of combined magnetophoresis and dielectrophoresis for magnetic particle manipulation will be described in more detail.

Magnetophoresis (MAP) refers to the movement of a magnetic particle actuated by a magnetic force in a medium, e.g. a sample fluid. One-dimensional magnetophoresis can be expressed by:

$$F_{m,x} + F_D = m\frac{d^2x}{dt^2} \quad \text{(Eq. 1)}$$

wherein $F_m$ is the magnetic force and $F_D$ is the fluidic drag force. $F_{m,x}$ is the component force of the magnetic force $F_m$ in the x direction. The magnetic force $F_m$ may be given by:

$$F_m = \frac{V \cdot \Delta_\chi}{2\mu_0}\nabla B^2 \quad \text{(Eq. 2)}$$

And the fluidic drag force $F_D$ may be given by:

$$F_D = -3\pi D\eta\frac{dx}{dt}f_D \quad \text{(Eq. 3)}$$

In the above equations the following holds:

m is the mass of the magnetic particle;

V is the volume of the magnetic particle;

$\mu_0$ is the magnetic permeability in free space;

$\Delta\chi$ is the difference of volume magnetic susceptibility between the magnetic particle and the medium, e.g. sample fluid;

D is the diameter of the magnetic particle;

η is the viscosity of the medium, e.g. sample fluid;

$f_D$ is the fluidic drag force coefficient (R. Wirix-speetjens, W. Fyen, K. Xu, et al., IEEE T. Magn. 41(10), 4128 (2005)); and B is the magnetic flux density.

Dielectrophoresis (DEP) is the force effect when a magnetic particle is subjected to an inhomogeneous alternating electric field and is hence polarized with respect to the medium, e.g. sample fluid. The DEP force $F_{DEP}$, often termed "conventional DEP", can be expressed by in Eq. 4, $$F_{DEP}=2\pi r^3\epsilon_m Re[f_{CM}(\omega)]\nabla E^2 \quad \text{(Eq. 4),}$$

wherein $f_{CM}(\omega)$ is the Clausius-Mosotti factor which can be expressed by:

$$f_{CM}=(\epsilon_p^*-\epsilon_m^*)/(\epsilon_p^*+2\epsilon_m^*) \quad \text{(Eq. 5)}$$

Wherein:

E is the electric field;

$\epsilon_m$ is the medium permittivity;

$\epsilon_p^*$ is the complex particle permittivity; and $\epsilon_m^*$ is the complex medium permittivity.

As already discussed above, the device for manipulating magnetic particles in a medium, e.g. sample fluid, may, according to a preferred embodiment comprise a set of two meander-shaped current-carrying conductors A and B, also referred to as a set of two meanders A and B (see FIGS. 3 and 4). In both embodiments of FIG. 3 and FIG. 4 the meanders A and B are partially overlapping with each other. At locations where the meanders A and B cross each other, or thus overlap each other, the meanders A and B may be located at another conductive material level, e.g. metal level. In other words, the part of meander A where it crosses meander B may be formed in another conductive material layer, e.g. metal layer 9, than the conductive material layer, e.g. metal layer 10, in which the other parts of meander A which do not cross meander B are formed. Connections between both conductive material layers, e.g. metal layers 9, 10 may be made by vias 11.

Figure 5:
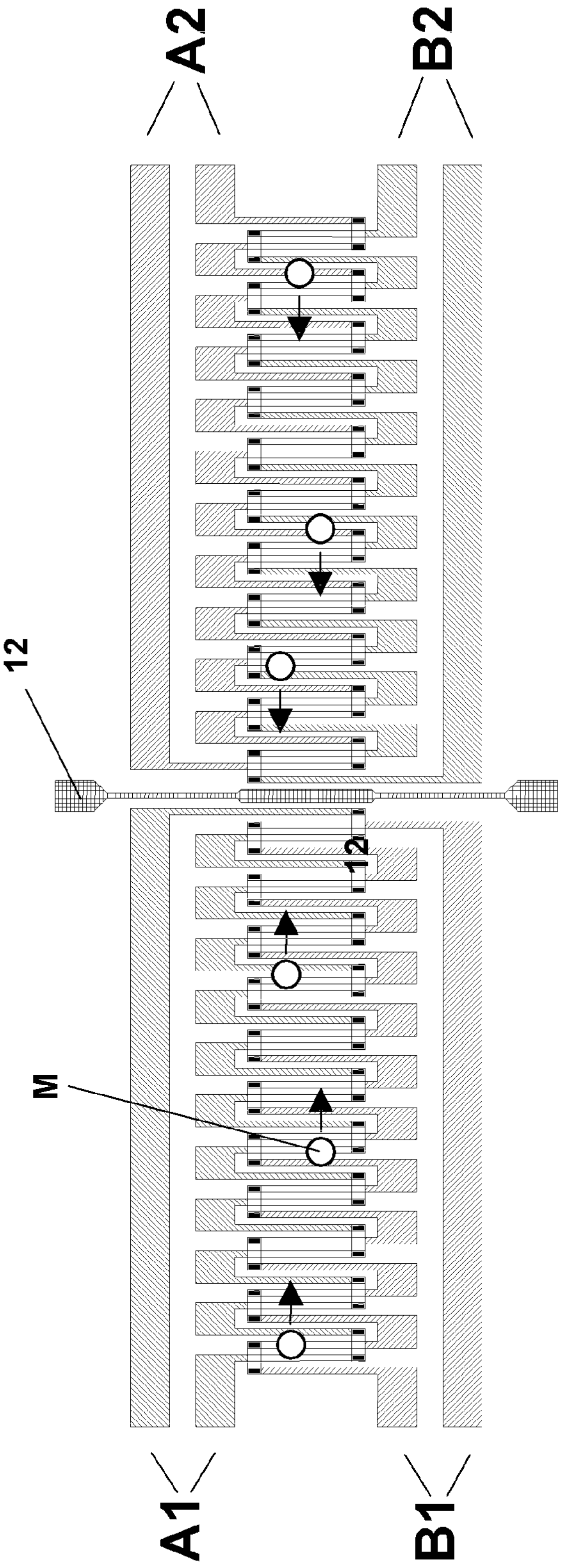
FIG. 5 illustrates a device according to a preferred embodiment.

FIG. 5 illustrates another embodiment of a device for manipulating magnetic particles in a medium, e.g. sample fluid. According to this embodiment, the device may comprise a set of four electrically isolated conductors A1, B1, A2, B2. In principle, the device according to the present embodiment comprises two configurations as illustrated in FIG. 3 and thus comprises two pairs of two conductors, a first pair comprising conductors A1 and B1 and a second pair comprising conductors A2 and B2. Each pair of two conductors A1, B1 and A2, B2 is built up as described for the configuration of the embodiment in FIG. 3 and thus functions in a same way as partially overlapping meanders A and B as represented in FIG. 3.

Next, an experiment will be described which was performed with the device represented in FIG. 3. It has to be understood that this experiment is also valid for the devices represented in FIGS. 4 and 5 and for other devices in accordance with preferred embodiments using overlapping meanders.

As already discussed before, the two meanders A and B are electrically insulated from each other and can be operated independently. This can be obtained by using two different metal layers 9, 10 in combination with vias 11 for each meander A or B and by providing an insulating layer in between the two metal layers 9, 10, as was discussed above. In FIG. 3, the second metal layer 10 may be located at the top, i.e. closer to the sample fluid comprising the magnetic particles, when compared to the first metal layer 9. In the embodiment shown in FIG. 3, the largest part of the meanders A and B is formed in the second metal layer 10. At locations where the meanders A and B are crossing each other, part of one of the meanders A or B is moved to or, in other words, is formed in the first metal layer 9. Connections between the first and the second metal layer 9, 10 are made by vias 11.

Figure 6:
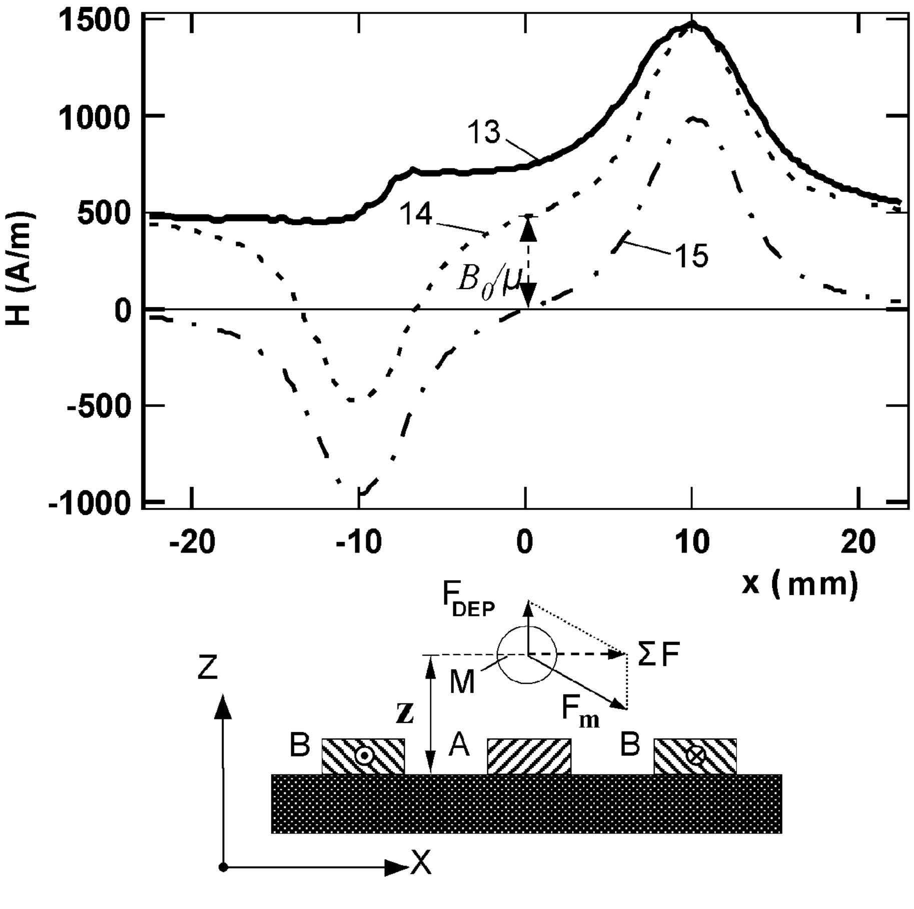
FIG. 6 illustrates the applied magnetic field and the principle for magnetic particle actuation according to preferred embodiments.

When a DC current ($I_{DC}$) is sent through one of the meanders A or B in a configuration as in FIG. 3, a magnetic field is built around that meander A or B (see FIG. 6). In the experiment, both the width and spacing of the meanders A and B were 5 μm. A current of 20 mA was sent through meander B. The magnetic field H was calculated and plotted using finite element modelling (ANSYS). An external field, required to push magnetic particles in a right direction (see further) was chosen to be $B_0$=0.6 mT. In FIG. 6 curve 13 shows the total magnetic field $H_{sum\_total}$, curve 14 shows the total magnetic field in the x-direction, i.e. the combination of the applied external magnetic field and the x-component of the generated magnetic field $H_{x\_total}$ and curve 15 shows the x-component of the generated magnetic field $H_x$. Due to the symmetry of the meander layout, $\nabla B^2=0$ at the position x=0 in FIG. 6, therefore there is no net in-plane force exerted on the magnetic particle. However, if a constant homogeneous external field $B_0$ is applied in the +x direction (indicated by the co-ordinate system in FIG. 6), the in-plane field will be biased, illustrated by the curve for $H_{x_}$total in FIG. 6 (indicate with reference number 14) and the in-plane force is not zero anymore. It can be seen from FIG. 6 that curve 14 has the same shape as curve 15 but is shifted upward when compared to curve 15. This is the effect of the homogeneous field $B_0$ indicating that the in-plane field is "biased". In this way the magnetic particle M can be moved one step from meander A to meander B in the +x direction (indicated by the co-ordinate system in FIG. 6).

Figure 7:
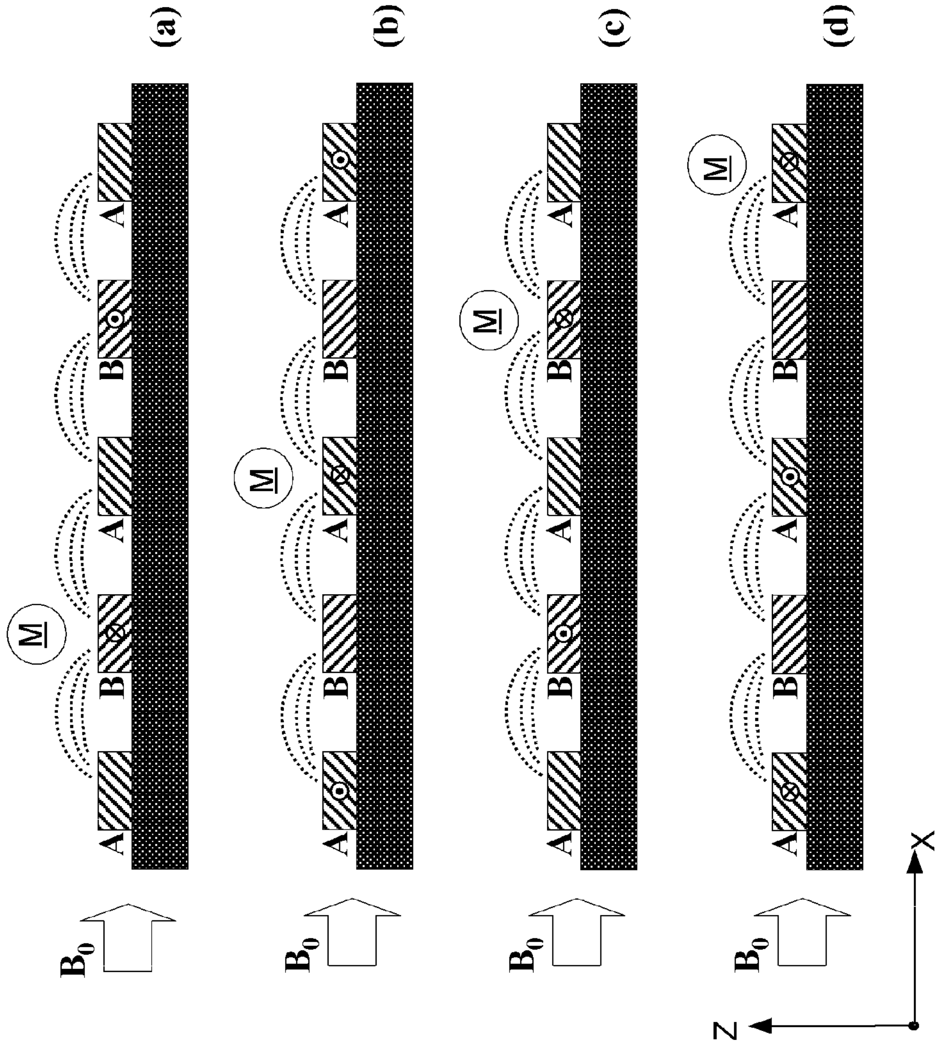
FIGS. 7(*a*)-7(*d*) provide cross-sectional views of the device of FIG. 3 and illustrates the principle for continuous actuation of magnetic particles in a fluid.

FIG. 7 shows a cross-sectional view of the device of FIG. 3 and illustrates the principle of combined MAP and DEP using such a device as illustrated in FIG. 3. For continuous actuation, both meanders A and B may alternatingly and periodically be fed with a DC current (see FIG. 7, step (a) vs. (b) and (c) vs. (d)), accompanied by an alternating switching of current direction for every meander (step (a) vs. (c) and (b) vs. (d) in FIG. 7). Thus, a DC current is alternatingly applied to meander A and meander B, thereby also switching the current direction. This means that a DC current is applied in the following 4 steps which are illustrated in FIG. 7:

step (a): a DC current is applied in meander B in direction 1, i.e. current in +Y direction for meander B at the left in FIG. 7(*a*), step (b): a DC current is applied in meander A in direction 1, i.e. current in +Y direction for conductor A at the right of the first conductor B in FIG. 7(*b*), step (c): a DC current is applied in meander B in a direction opposite to direction 1, i.e. current in −Y direction for meander B at the left in FIG. 7(*c*), and step (d): a DC current is applied in meander A in a direction opposite to direction 1, i.e. current in −Y direction for conductor A at the right of the first meander B in FIG. 7(*d*).

An external magnetic field $B_0$ is applied over the whole device in direction x. This is to determine the direction in which the magnetic particle M has to move. For example, when the external magnetic field is applied in the positive x direction, the magnetic particle will be moved in a direction to the right of the figure. When the external magnetic field is applied in the negative x direction, the magnetic particle M will be moved in a direction to the left of the figure.

In step 1 a DC current is sent through conductor B in a first direction, in the example given in the plane of the paper. The magnetic particle M is attracted towards the conductor B by the in-plane component of the magnetic field generated by the conductor B in the same direction as $B_0$. In step 2 the current is switched from conductor B to conductor A. Therefore, a current is sent through conductor A in a direction in the plane of the paper. The magnetic particle M will be attracted from conductor B to conductor A in a direction to the right of the figure. Steps 3 and 4 resemble steps 1 and 2, respectively, however a current is sent through the conductors B and A in a direction opposite to the direction of step 1 and 2.

By periodically repeating steps 1 to 4, the magnetic particle M can be transported continuously. The transport direction can be simply reversed by changing the step sequence, e.g., switching step 2 and 4. These 4 steps may be repeated as many times as needed to move one or more magnetic particles M from a starting point to a point where they need to arrive, e.g. to a point where they need to be detected. Consequently a travelling in-plane magnetic field is produced, which actuates the magnetic particles M step by step.

Meanwhile, a high frequency AC sinusoidal signal ($V_{AC}$) is applied across the two meanders A and B in order to create an inhomogeneous AC electric field ($E_{AC}$) in the vicinity of the device surface. By carefully selecting the AC signal frequency according to the complex permittivity of the magnetic particle and the medium, e.g. sample fluid, a negative DEP force is applied to the magnetic particle M in order to balance the out-of-plane component of the magnetic force and gravity working on the magnetic particle M. The out-of-plane position of the magnetic particle M may thus be determined by the balance between the negative DEP force and the out-of-plane magnetic force as well as the particle gravity. Therefore, by simultaneously applying the alternating DC current (magnetophoresis) and the high frequency AC signal (dielectrophoresis), the magnetic particle M can, according to the present embodiment, be transported in the x direction at a controlled position in the z direction. The frequency of the AC signal $V_{AC}$ can range from 100 Hz to 50 MHz, most often from 1 kHz to 10 MHz, depending on the complex permittivity of the medium, e.g. sample fluid, and the magnetic particles M. In the experiments which will be described below, $V_{AC}$ was 1 MHz to create a negative dielectrophoresis of Dynabead CD45 magnetic particle (diameter D=4.5 μm, magnetic volume susceptibility $\chi$=0.1; and obtainable from Invitrogen, Merelbeke, Belgium) in a MEM (Eagle's minimum essential medium) cell culture medium, which may comprise most essential nutrients for cell growth.

In the experiments, the meanders A and B were made of Au with a TiW alloy at the bottom and top as an adhesion layer. The line width of the meanders was 10 μm, the thickness was 100 nm for the first metal layer 9 and 1.2 μm for the second metal layer 10. The two metal layers 9, 10 were electrically isolated from each other by a 450 nm thick $Si_3N_4$ layer and thus, the distance between the first and second metal layers 9, 10 was 450 nm. The width of the vias 11 connecting the first and second metal layers 9, 10 was 8 μm and the depth of the vias 11, which is equal to the distance between the first and second metal layers 9, 10 was thus also 450 nm.

The device was fabricated using optical lithography. On a silicon wafer with 150 nm thermally grown $SiO_2$, TiW 10 nm/Au 100 nm/TiW 10 nm was sputtered and patterned as the first metal layer 9. The meanders formed on the bottom metal layer are 25×10 μm. Afterwards 450 nm $Si_3N_4$ was deposited by plasma enhanced chemical vapor deposition, and vias 11 with a size of 8 μm×3 μm between the first and second metal layer 9, 10 were patterned and then etched by CF4 plasma. Finally the second metal layer 10 Ti 10 nm/Au 1.2 μm was sputtered, patterned and etched by, for example, ion milling, with a width of 5 μm for the long lines L or stripes in the meanders (vertical lines or lines in the Y-direction in FIG. 3). At the locations of the U turn, the meander is moved to the first metal level. Moving of the magnetic particles M is achieved by the long lines L of the meanders. Both the $Si_3N_4$ insulation and the second metal layer 10 were thick in order to reduce the RC delay for the high frequency AC signal. As the total length of parts of the meanders A and B formed in the first metal layer 9 is short compared to the parts of the meanders A and B formed in the second metal layer 10, the parts of the meanders A and B in the first metal layer 9 only have a little contribution to the total resistance. Therefore the small thickness of the first metal layer 9 does not significantly increase the RC delay of the device.

A manipulation experiment was performed using the device as illustrated in FIG. 3 with Dynabead CD45 in the MEM cell culture medium. The alternating DC current was provided by a Keithley 2400 (Keithley Instruments Inc., OH) and switched by a Keithley 7001. Both instruments were controlled by a controller, e.g. a suitably programmed computer. The high frequency AC signal was fed by a HP5160 function generator (Hewlett-Packard Co., CA) with the amplification by an OP 467 operational amplifier (Analog Devices, MA).

Figure 8:
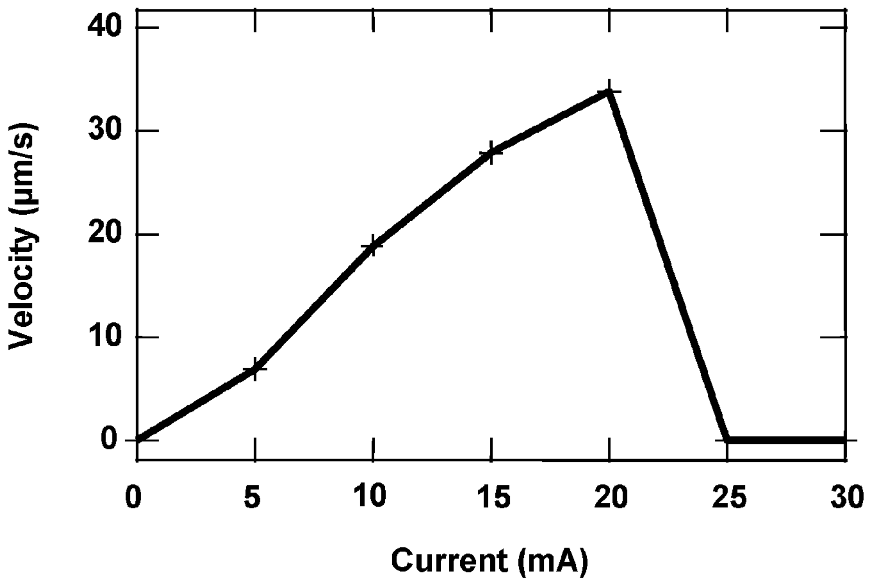
FIG. 8 illustrates magnetic particle transport velocity as a function of actuation current.

The magnetic particle transport velocity was measured under different actuation conditions. As the traveling magnetic field is driving the magnetic particle M, the particle transport velocity changes as a function of the current $I_{DC}$ amplitude and switching frequency. When the switching frequency is low enough, at fixed $I_{DC}$ amplitude, the magnetic particle M can follow the traveling field. Above a certain frequency (cutting frequency), which frequency is depending on the amplitude of the current $I_{DC}$, the magnetic particle M starts to lag and stops moving. This means that the frequency is too high. Therefore, at this cutting frequency the magnetic particle M can be actuated with the highest velocity. The highest velocity is plotted in FIG. 8 as a function of the current $I_{DC}$ for $V_{AC}$=2 $V_{p-p}$ at 1 MHz and $B_0$=0.6 mT. The maximum velocity increases monotonously as $I_{DC}$ increases from 0 to 20 mA. However, when $I_{DC}$ continues to increase, the particle M stops moving. So when the current becomes too large, in the example given when the current becomes higher than 20 mA, the negative DEP force is not strong enough to balance the out-of-plane component of the magnetic force. As a consequence the magnetic particle M may be attracted by the meander and may finally adhere to surface of the device. The maximum velocity of the magnetic particle M is thus limited by the negative DEP force exerted on the magnetic particle M. The DEP force is dependent on the frequency and amplitude of the applied AC electric field.

Figure 9:
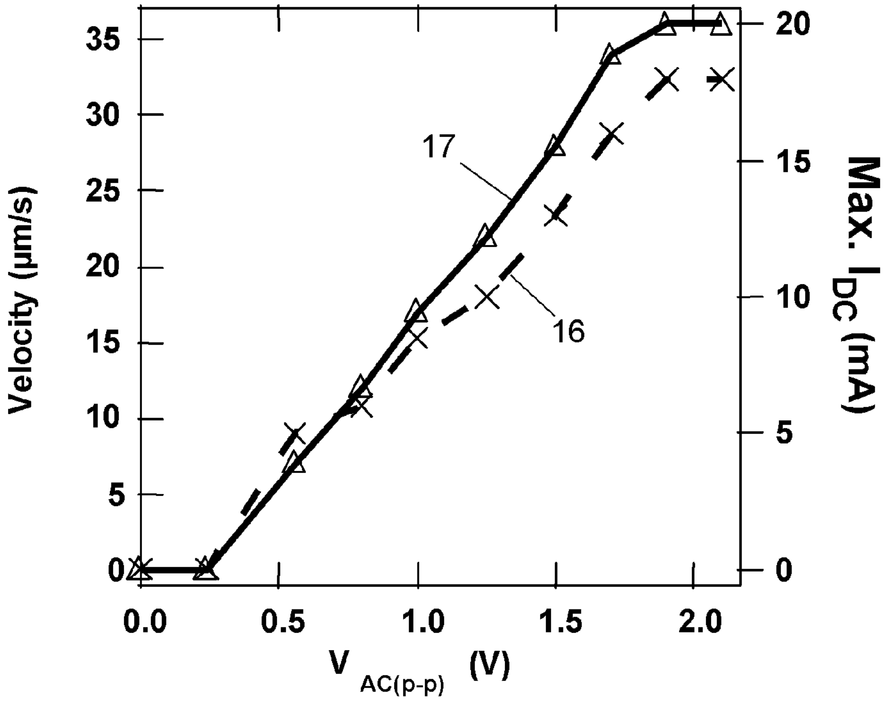
FIG. 9 illustrates maximum actuation current and transport velocity as a function of $V_{AC}$ amplitude.

By watching the out-of-plane position of the magnetic particles M with a microscope while sweeping the $V_{AC}$ frequency, it was found that the highest negative DEP may be reached at 1 MHz. In order to study the impact of the DEP force on the transport, the maximum velocity of the magnetic particle M as a function of $V_{AC}$ amplitude was studied. FIG. 9 illustrates maximum actuation current (curve 16) and transport velocity (curve 17) as a function of $V_{AC}$ amplitude. The frequency of $V_{AC}$ was always at 1 MHz. The velocity of the magnetic particles M can be increased by a larger in-plane magnetic force, which requires application of a larger external in-plane magnetic field ($B_0$) or a higher current-induced traveling magnetic field gradient. However, since the out-of-plane component of the magnetic force also increases as a consequence of the larger in-plane magnetic force, the negative DEP force needs to be enlarged. This also keeps the separation distance and thus guarantees particle mobility.

Figure 10:
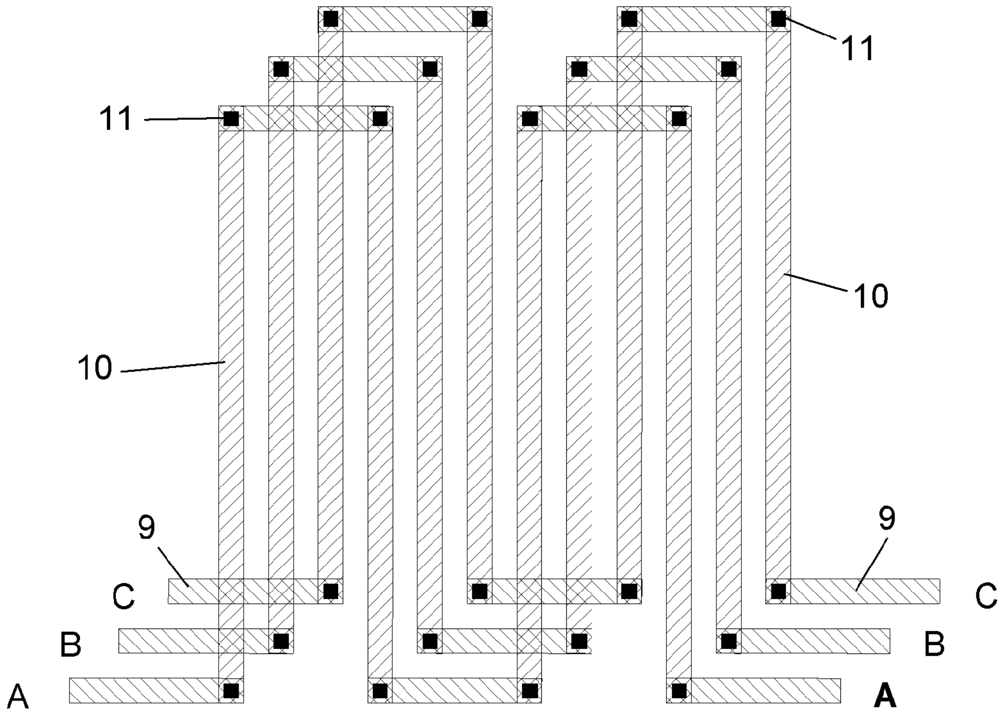
FIG. 10 illustrates a device according to a preferred embodiment.

In the above embodiments, the device for manipulating magnetic particles in a medium comprises a set of two meanders or conductors A, B or a set of two pairs of meanders A1, B1 and A2, B2. However, according to other preferred embodiments, the device may also comprise a set e.g. three conductors or may comprise a set of any other suitable number of conductors. In FIG. 10, a top view of a possible arrangement of three conductors A, B, C for actuation of magnetic particles M by combined magnetophoresis and dielectrophoresis is shown. According to this embodiment, the three meanders A, B and C are partially overlapping. Similar to the embodiments of FIGS. 3, 4 and 5, the meanders A, B and C may be formed in two conductive material layers, e.g. metal layers 9, 10. The two conductive material layers, e.g. metal layers 9, 10, are electrically insulated from each other by an insulating layer, e.g. a dielectric layer. At locations where the meanders A, B and C overlap, i.e. at the turning points, the shortest segments (horizontal in FIG. 10) move to the other conductive material level, e.g. metal level 9. In other words, those parts of e.g. meander A which overlap with meander B or C are formed in another conductive material layer, e.g. metal layer 9, than the conductive material layer, e.g. metal layer 10, in which the parts of meander A which do not show an overlap with meander B or C are formed. The different parts of each meander A, B or C formed in the different conductive material, e.g. metal layers 9, 10, are connected through vias 11.

Figure 11:
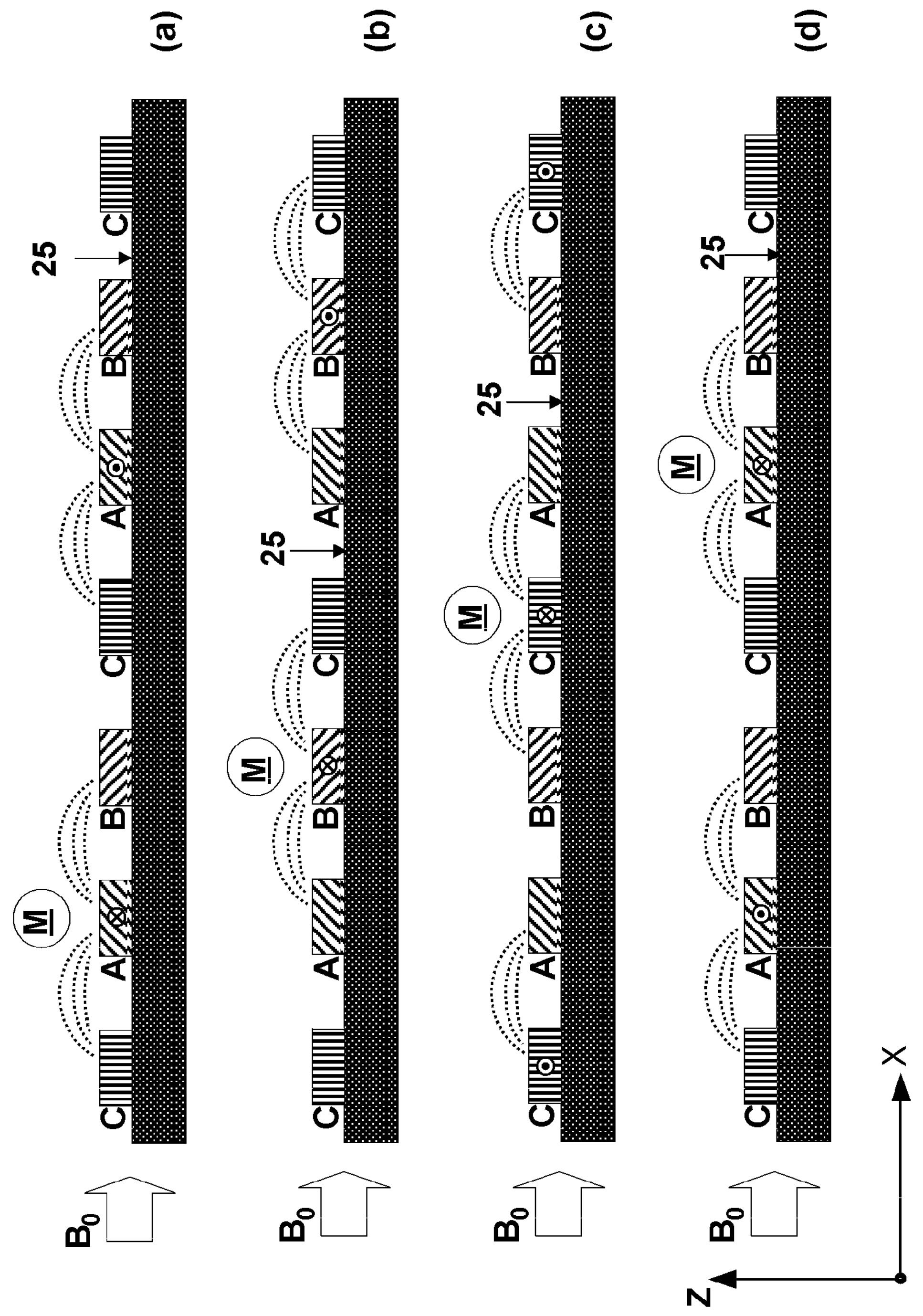
FIGS. 11(*a*)-11(*d*) schematically illustrate the operation principle of combined magnetophoresis and dielectrophoresis with an in-plane homogeneous bias field for the device of FIG. 10.
Figure 12:
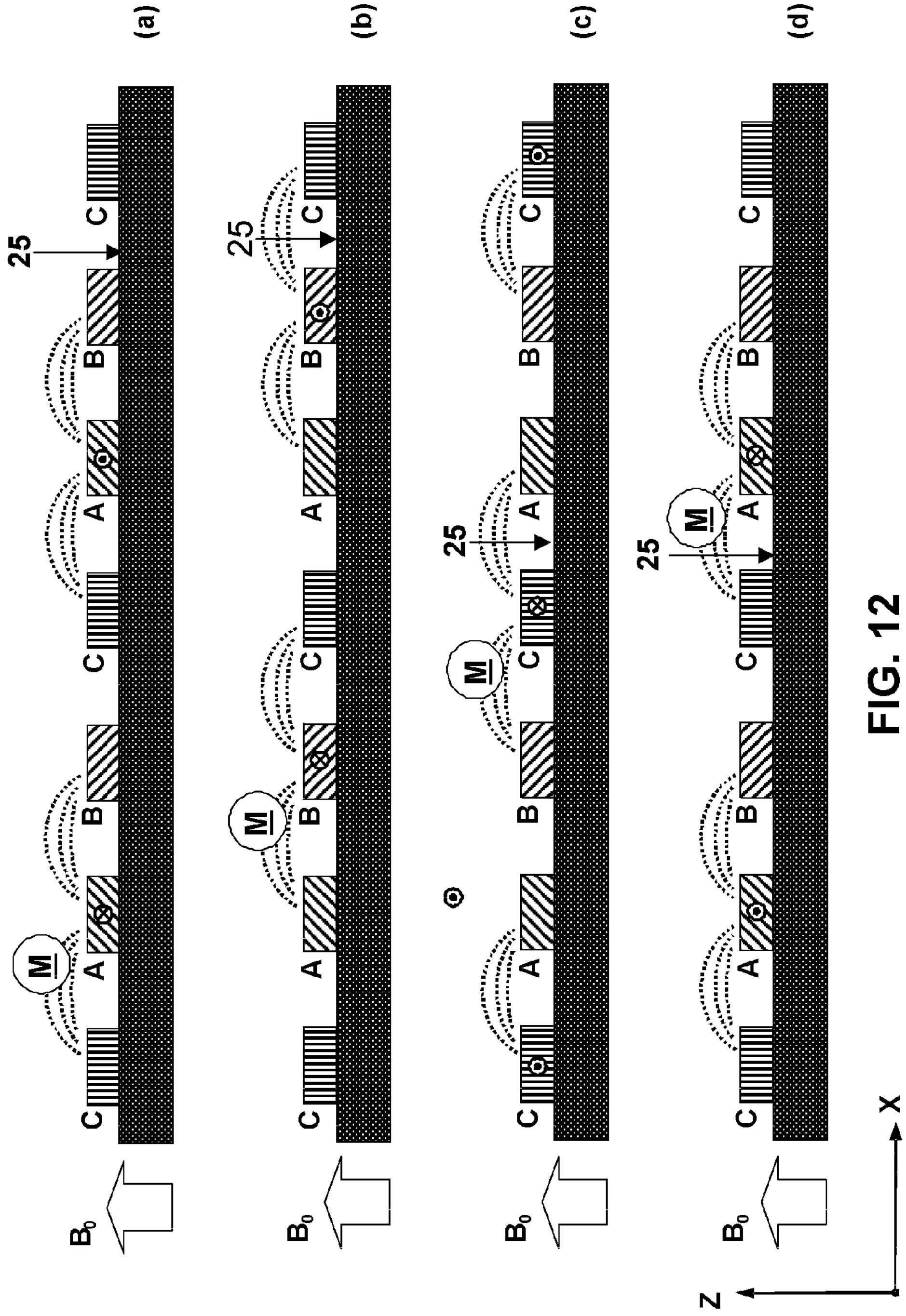
FIGS. 12(*a*)-12(*d*) schematically illustrate the operation principle of combined magnetophoresis and dielectrophoresis with an out-of-plane homogeneous bias field for the device of FIG. 10.
Figure 13:
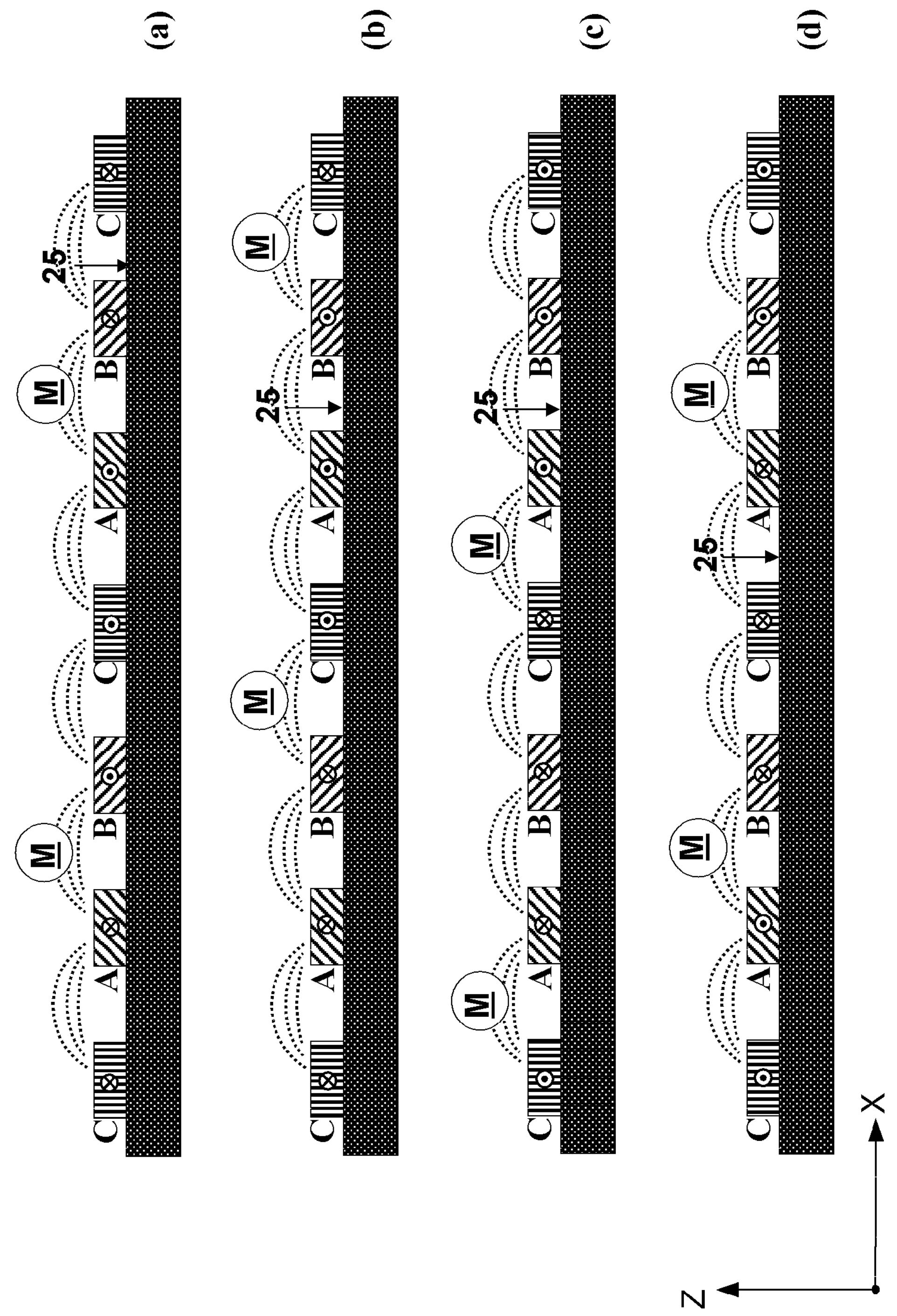
FIGS. 13(*a*)-13(*d*) schematically illustrate the operation principle of combined magnetophoresis and dielectrophoresis without any bias field for the device of FIG. 10.

FIGS. 11, 12 and 13 show the transport of magnetic particles M with combined magnetophoresis and dielectrophoresis using a device according to the present embodiment, i.e. using a device comprising a set of three conductors A, B and C as represented in FIG. 10.

FIG. 11 shows a cross-section of the device represented in FIG. 10. FIG. 11 illustrates the actuation principle based on the combined magnetophoresis and dielectrophoresis using a device comprising a set of three conductors A, B and C with an applied external in-plane homogeneous bias field $B_0$. First, a DC current is alternately applied to conductors A, B, and C respectively, as indicated in FIGS. 11 (*a*), (*b*), and (*c*), in a first direction. This means that during a first time period, a current is sent in a first direction through the conductor A, while no current is sent through the conductors B and C. During a second time period, a current is sent in the first direction through the conductor B, while no current is sent through the conductors A and C. During a third time period, a current is sent in the first direction through the conductor C, while no current is sent through the conductors A and B. Next, a DC current is alternately sent through conductors A, B, and C respectively in a second direction opposite to the first direction, as indicated in FIG. 11 (*d*) for conductor A. This means that during a fourth time period, a current is sent in the second direction through the conductor A, while no current is sent through the conductors B and C. During a fifth time period, a current is sent in the second direction through the conductor B, while no current is sent through the conductors A and C. And during a sixth time period, a current is sent in the second direction through the conductor C, while no current is sent through the conductors A and B. As can be seen from FIGS. 11 (*a*) to (*d*), the magnetic particles M moves from conductor A to conductor B to conductor C and back to conductor A. An AC voltage is simultaneously applied over the conductors A, B and C in order to keep the magnetic particle M from adhering to the surface 25 of the device or, in other words, to keep the magnetic particle M at a desired distance z above the surface 25 of the device.

FIG. 12 illustrates the actuation principle of the combined magnetophoresis and dielectrophoresis using a device comprising a set of three conductors A, B and C with an out-of-plane homogeneous bias field $B_0$ (cross section view). In this case, first a DC current is applied to conductor A in a first direction (see FIG. 12(*a*)). Then, a DC current is applied to conductor B in a first direction (see FIG. 12(*b*)). In a further step the same is done for conductor C (see FIG. 12(*c*)). Then, a DC current is applied to conductor A in a second direction opposite to the first direction (see FIG. 12(*d*)), and the same is done for conductors B and C (not illustrated). These steps may be repeated as many times as necessary to bring the magnetic particle M to a desired location, e.g. to a detector 12 for detecting the magnetic particle M. The magnetic particle M moves from conductor A to conductor B to conductor C. The actuation scheme in this case differs from the one illustrated in FIG. 11(*a*)-(*d*) because in the present case, the total magnetic field in the z-direction becomes dominant due to the external homogeneous bias field $B_0$. In the case of three conductors A, B, C the external magnetic field does not have the purpose of indicating the direction of movement of the magnetic particle because this direction is determined by the driving sequence of the conductors. An AC voltage is simultaneously applied over the conductors A, B and C in order to keep the magnetic particle M from adhering to the surface 25 of the device or, in other words, to keep the magnetic particle M at a desired distance z above the surface 25 of the device.

FIG. 13 shows the actuation principle of the combined magnetophoresis and dielectrophoresis using a device comprising a set of three conductors A, B and C without any applied external bias field (side view). In this case, all three conductors A, B and C are fed simultaneously with independent DC currents. The magnetic particles M are magnetized by the fields created by neighbouring conductors (A-B, B-C or C-A). By synchronizing switching of the currents through the three conductors A, B and C as shown in FIG. 13, the magnetic particles M can be transported bi-directionally. An AC voltage is simultaneously applied over the conductors A, B and C in order to keep the magnetic particle M from adhering to the surface 25 of the device or, in other words, to keep the magnetic particle M at a desired distance z above the surface 25 of the device.

Hereinafter, some examples of manipulation of magnetic particles M will be described.

A first example of manipulation of magnetic particles M in a sample fluid may be separation of different magnetic particles M present in a same medium, e.g. sample fluid.

In this context, a "separation distance" may be defined as the out-of-plane distance between the magnetic particle M and the surface 25 of the device in which the conductors are located, or a distance between the magnetic particle M and the surface 25 of the device in the z-direction, as indicated by the co-ordinate system in the figures. "Out-of-plane distance" is defined as the distance between the magnetic particle M and the surface 25 of the substrate in a direction substantially perpendicular to the plane of traveling magnetic field and thus substantially perpendicular to the plane of the surface 25 of the device. "In-plane" is defined as the plane in which the alternating magnetic field travels and thus as the plane in which the magnetic particles M are transported. This is very often a plane substantially parallel to the plane of the surface 25 of the device.

The combined MAP and DEP actuation method according to preferred embodiments may thus be used to separate magnetic particles M with different magnetophoretic mobility and/or dielectrophoretic properties from each other. According to this example, magnetic particles M having different physical or chemical properties and thus consequently experiencing different DEP and MAP forces, different DLVO forces and/or different gravity, may be separated from each other.

Magnetophoretic mobility or MAP mobility ($M_m$) may, when $d^2x/dt^2$ becomes zero in (Eq. 1), i.e. when the magnetic particle M reaches a constant velocity ($v_c$), be defined by:

$$v_c = M_m \cdot \frac{\nabla B^2}{2\mu_0 f_D} \quad \text{(Eq. 6a)}$$

$$\text{wherein } M_m = \frac{\Delta\chi V}{3\pi D\eta} \quad \text{(Eq. 6b)}$$

The MAP mobility depends on the physical properties of the magnetic particle M and the medium in which the magnetic particle M is present, as indicated by (Eq. 6b). As different types of magnetic particles M may normally have a different MAP mobility, they will, in a same magnetic field and in a same medium, e.g. sample fluid, migrate or be transported with different velocity. Therefore they can be separated from each other in a microfluidic system. When, for example, two types of magnetic particles M are transported at a same time, their velocities can be increased when the switching frequency of the DC current through the different conductors A, B, C is turned higher. At switching frequencies higher than a certain value (cutting frequency, $f_c$), those magnetic particles M with a lower MAP mobility will not be able to follow the traveling magnetic field. The cutting frequency $f_c$ reflects the mobility of the magnetic particle M. It depends on the size of the magnetic particle M, the magnetic property of the magnetic particle M, the viscosity of the medium and the generated magnetic field (see also C. Liu, L. Lagae, R. Wirix-Speetjens and G. Borghs, J. Appl. Phys. 101, 024913 (2007)). As a result, at a switching frequency equal to or higher than $f_c$, only the magnetic particles M with a higher MAP mobility can be transported by the traveling magnetic field. Consequently, the two types of magnetic particles M present in the medium, e.g. sample fluid, can be separated from each other. This separation principle can be further applied to more than two types of magnetic particles M, and/or to magnetic particles M bound to target bio-analytes.

Separation of different types of magnetic particles M can also be performed according to different DEP properties of different types of the magnetic particles M. According to prior art, different magnetic particles M are separated with negative and positive DEP forces depending on their own DEP properties. Some particles are attracted to the conductors and hence are separated from other particles (see WO 2001/96857 A2). With the device according to preferred embodiments, DEP separation can be used in combination with magnetic separation. Aside from particles M which experience positive DEP and are attracted to the device surface, magnetic particles M having negative DEP can be exerted with different negative DEP forces in a same AC electric field. Hence, they can be levitated to a different separation distance, i.e. to a different distance z from the surface 25 of the device.

Figure 14:
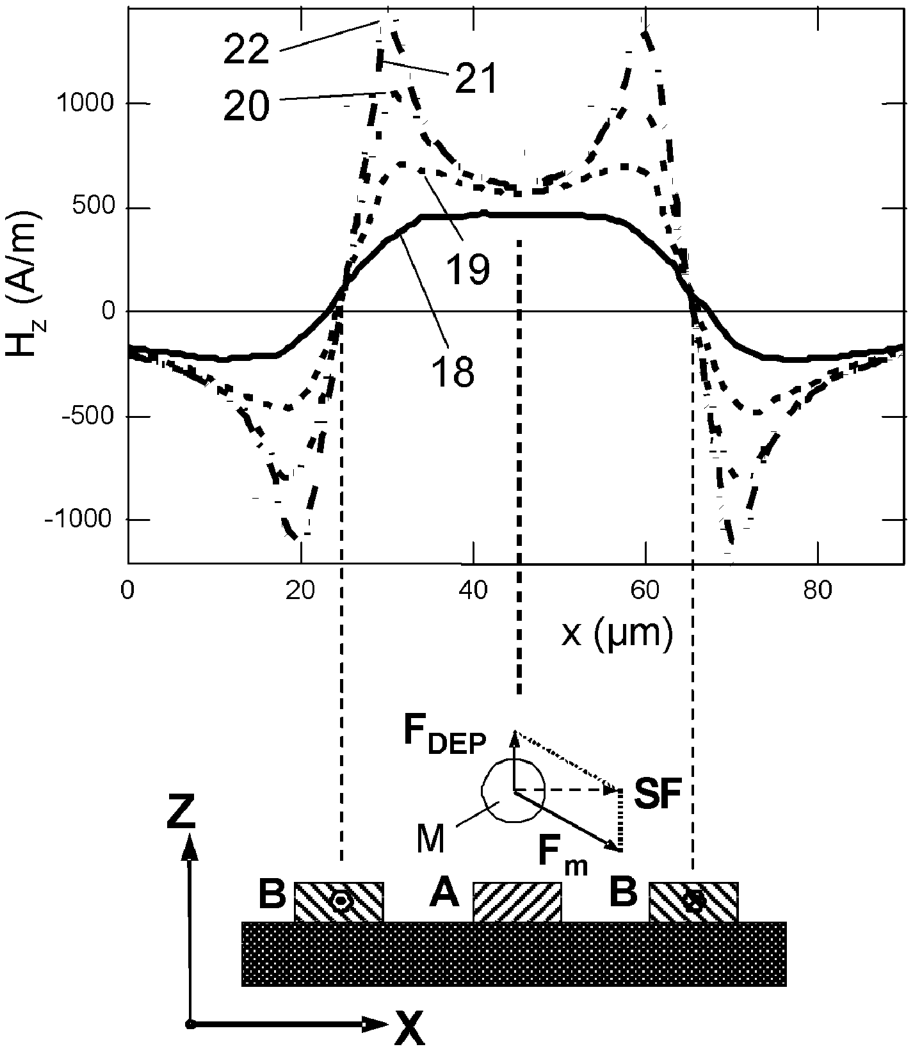
FIG. 14 shows out-of-plane (Z) component of the magnetic field as a function of separation distance (z).
Figure 15:
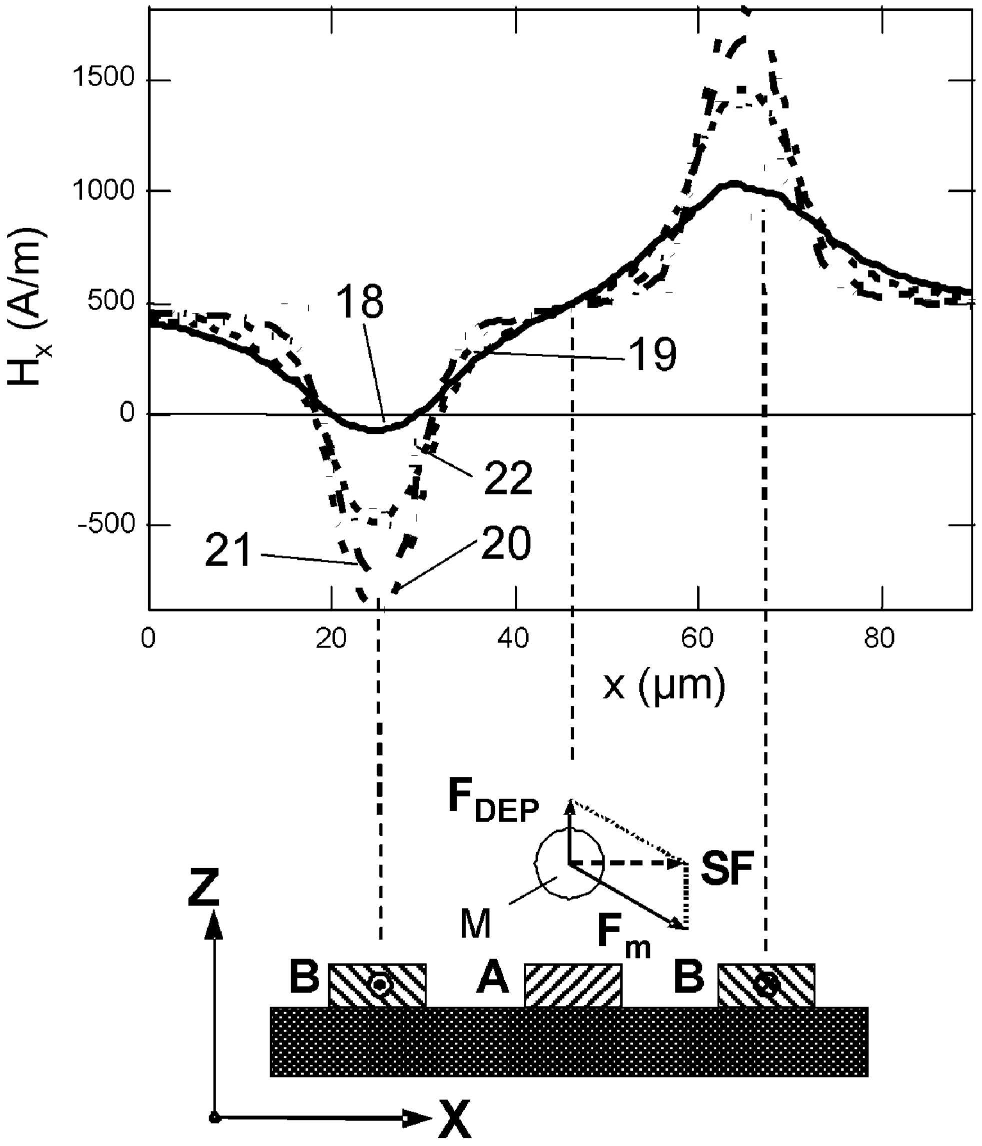
FIG. 15 shows in-plane (X) component of the magnetic field as a function of separation distance (z).
Figure 16:
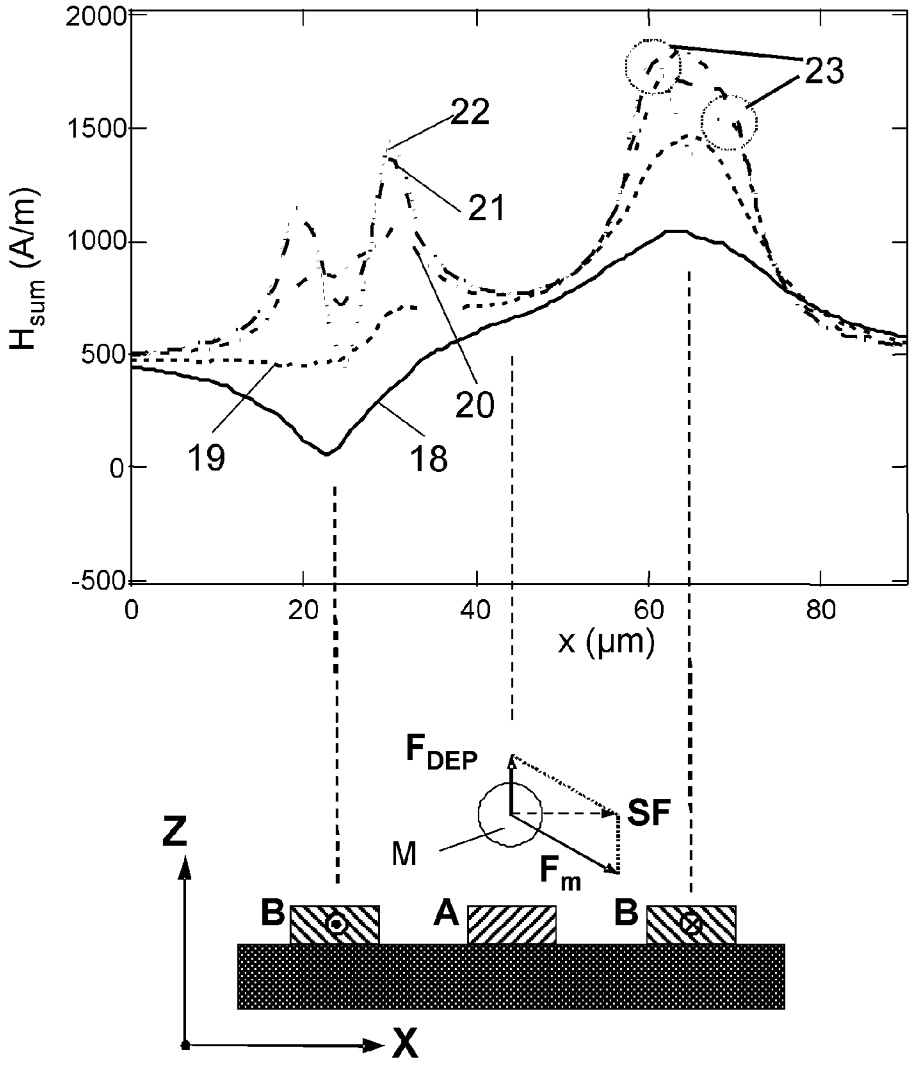
FIG. 16 shows total magnetic field strength as a function of separation distance.

On the other hand, the traveling magnetic field is different at different separation distances, as illustrated in FIGS. 14, 15 and 16, which respectively illustrate the out-of plane component $H_z$ of the magnetic field, the in-plane component $H_X$ of the magnetic field and the total magnetic field $H_{sum}$ as a function of the separation distance z. In these figures curve 18 is for a distance z of 10 μm, curve 19 for 5 μm, curve 20 for 2.5 μm, curve 21 for 1 μm and curve 22 for 0.5 μm. In these experiments, an external magnetic field $B_0$=0.6 mT was applied.

As the traveling magnetic field depends on the separation distance z, different magnetic particles M can feel different magnetic fields depending on their different DEP properties.

For example, at z=5 μm (curve 19) the total magnetic field $H_{sum}$ (FIG. 16) has a maximum above a current-carrying conductor, in the example given conductor B. Therefore the magnetic particle M can be moved from one conductor B to the other conductor A by the traveling field. From the figure it can be seen that the magnetic field has a barrier at both edges of a current-carrying conductor, in the example given conductor B, for separation distance z smaller than 5 μm. For a separation distance z of 1 μm (curve 21) the magnetic field maxima are at the edges of the current-carrying conductor, in the example given conductor B, because in this case the out-of-plane component $H_z$ of the field now dominates the magnetic field $H_{sum}$ (see FIG. 16). Therefore, at z=1 μm the magnetic particle M cannot be transported continuously by the traveling magnetic field but rather keeps swinging between the two magnetic field barriers (indicated with reference number 23 in FIG. 16) of the conductors A, B. Magnetic particles M with different DEP properties can be levitated to different separation distances z and consequently they are subject to a different traveling magnetic field because the traveling magnetic field differs as a function of the separation distance z. Because of this, it is possible to, for example, hold one type of magnetic particles M while transporting the other type and different types of magnetic particles M may be separated from each other in that way. According to other embodiments, it may also be possible to transport different magnetic particles M with different velocity, in that way also separating different types of magnetic particles M. The above-described separation principle can also be applied to more than two types of magnetic particles M, and/or to magnetic particles M bound to target bio-analytes. In the latter case, target bio-analytes bound to magnetic particles M can be separated from free single magnetic particles M. This is because, when bio-analytes are bound to magnetic particles M, the DEP property of the complex will be determined by both the magnetic particles M and the bio-analytes.

A further implementation of manipulation of magnetic particles M is the attraction and repulsion of magnetic particles M to and from the surface 25 of the device. This may be used to, when the device is a sensor device, improve a detection limit of the device. Besides magnetic particle transport and separation, the combined MAP and DEP actuation principle according to preferred embodiments can be used in, for example, magnetic bio-molecule assays in order to increase the signal specificity and sensitivity.

Figure 17:
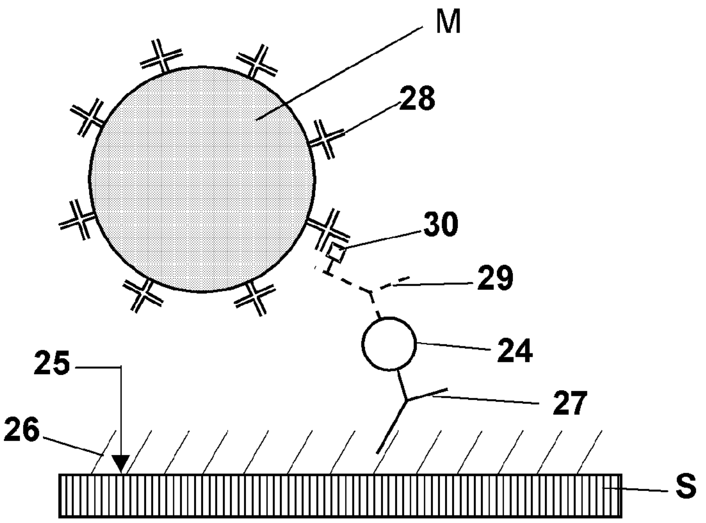
FIG. 17 schematically illustrates a magnetic particle based sandwich assay.

For example, in a typical magnetic immunoassay, a sandwich structure is built up as illustrated in FIG. 17. To detect target bio-molecules or analytes 24, for example a specific protein in human blood, a sample fluid comprising the target bio-molecules or analytes 24, for example a droplet of human blood, can be put onto a detection surface 25 the device. The detection surface 25 of the device may be functionalized with specific molecules 26. In a sandwich assay, the functionalized detection surface 25 may be pretreated with primary antibodies 27 which bind to the specific molecules 26 on the detection surface 25. The primary antibodies 27 can capture target bio-analytes 24 present in the sample fluid by immuno-recognition. Consequently, magnetic particles M present in the sample fluid, which are functionalized by specific molecules 28, may then be linked to the specific molecule/antibody structure by secondary antibodies 29 bound to the target bio-analytes 24. For example, the secondary antibody 29 may comprise biotin molecules 30 and the specific molecules 28 on the magnetic particles M may be streptavidin. In this case, linking the magnetic particles M to the target bio-molecules or analytes 24 may occur by binding of the biotin 30 to the streptavidin 28. In that way, the magnetic particles M are linked to the detection surface 25 of the device in a sandwich assay. The concentration of target bio-analytes 24 in the sample fluid can then be derived from the amount of magnetic particles M measured with a detector 12, e.g. a sensor. In such an assay, it is favorable that as many functionalized magnetic particles M as possible are attracted to the detection surface 25, so that more sandwich structures can be labeled with magnetic particles M and hence the final signal can be maximized.

Among all magnetic particles M which are attracted to the device surface 25, some particles M may specifically be captured by the sandwich structure, while others are simply physically attracted and sit on the surface without biochemical binding. The latter is called non-specific binding. After the complete sandwich structure is built with the magnetic particle M at the end, as shown in FIG. 17, non-specifically bound magnetic particles M need to be removed, e.g. washed away, from the surface, because otherwise they would give rise to a false positive signal of the sensor device. This is another requirement of magnetic particle based immunoassays. Many applications simply use fluid flushing to remove the non-specifically bound magnetic particles M. However, the controllability of flushing and hence the reproducibility of the immunoassay is poor.

Figure 18:
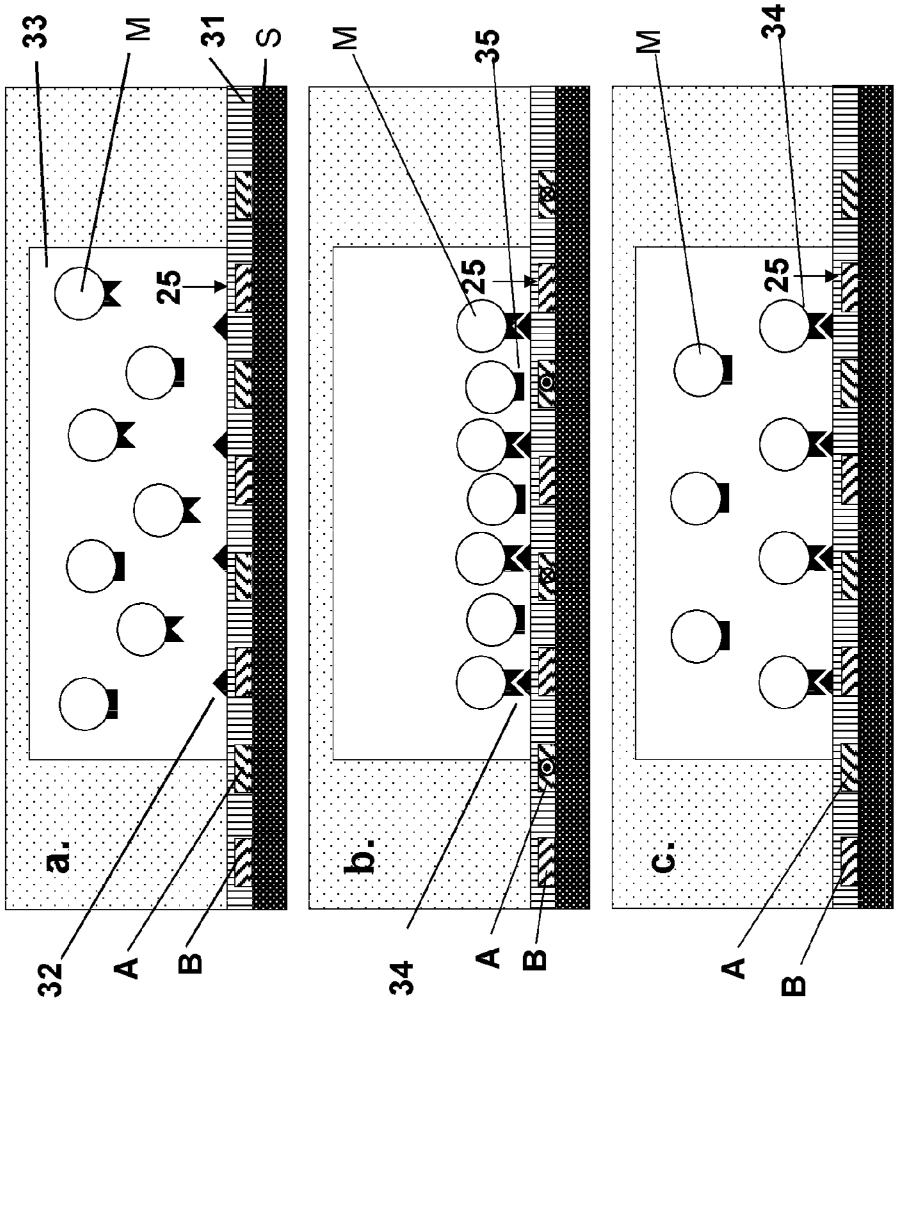
FIGS. 18(*a*)-18(*c*) schematically illustrate combination of MAP and DEP forces to attract and repulse magnetic particles.

Both controllability and reproducibility can be achieved by the combination of MAP and DEP according to preferred embodiments. An example of a device suitable to be used for this purpose is shown in FIG. 18(*a*) to (*c*). On a substrate S conductors A and B which are electrically isolated from each other are included in a bio-affinity layer 31. On top of the bio-affinity layer 31 there are receptors 32. Functionalized magnetic particles M present in a medium may be provided in a microfluidic channel 33 (see FIG. 18*a*). These functionalised magnetic particles M may be randomly dispersed in the medium. A magnetic field may be generated for attracting the magnetic particles M to the detection surface 25 of the device (see FIG. 18*b*). The magnetic force is activated for all magnetic particles M and thus most magnetic particles M present in the microfluidic channel 33 may be attracted to the surface 25. In this way, some of the magnetic particles M will be bound to specific molecules at the detection surface 25, hereby forming specifically bound magnetic particles 34. Other magnetic particles M will be attracted towards the detection surface 25 without being bound thereto, thereby forming non-specifically bound magnetic particles 35. After incubation, the magnetic field may be turned off and a negative DEP may be applied (see FIG. 18*c*). By doing so, substantially all magnetic particles M, both specifically bound 34 and non-specifically bound 35 to the detection surface 25, will feel a repulsive DEP force. As the specific binding 34 is stronger than non-specific binding 35 due to the sandwich structure, only the non-specifically bound magnetic particles 35 will be removed by the negative DEP force if this negative DEP force magnitude is well-chosen. With well-chosen is meant that the negative DEP force magnitude is big enough to remove non-specifically bound magnetic particles 35 but not so big as to remove specifically bound magnetic particles 34. Hence, the weak non-specifically bound magnetic particles 35 are repulsed from the device surface 25, leaving only specifically bound magnetic particles 34 on the surface 25 for the assay. In this case the magnetic immunoassay can be performed with lower detection limit but higher specificity and efficiency, because there is no disturbance of non-specifically bound magnetic particles 35.

A further implementation of manipulation of magnetic particles M in a medium, e.g. sample fluid is active mixing by using the combined MAP and DEP actuation principle according to preferred embodiments.

In microfluidic systems, laminar flows dominate whereas turbulent flows dominate in macro-systems. In laminar flows, the diffusion of molecules is much reduced when compared to turbulent flows. Therefore different substrates or different molecules of a chemical/biochemical reaction can experience difficulties to meet each other in order to react. As a result, the reaction efficiency in laminar flows is lower than that in a turbulent flow. For, for example, solid state biosensors, it has been shown that the detection limit and efficiency are mainly limited by the slow diffusion of molecules, because target analytes in the vicinity of the sensor can be quickly depleted, e.g. captured or consumed by the sensor (see P. R. Nair and M. A. Alam, Appl. Phys. Lett. 88, 233120 (2006)). Contrarily, few bio-molecules which are not in the vicinity of the sensor can reach the sensor within an acceptable period of time. Therefore, the improvement of mixing is imperative in microfluidic systems. Main efforts on the improvement of mixing can be classified into three categories: direct force on target analytes, passive mixing and active mixing. The direct forces on target analytes are normally electrophoretic or dielectrophoretic forces. However, these forces are highly dependent on the charges of the target analytes and are thus not generic for mixing. The passive mixing often refers to improved mixing with specially designed microfluidic channel geometries or channel surfaces. However, this is difficult to control and the system would become very complex to achieve a good mixing. Active mixing means the use of actively moving components (e.g. mechanical parts) or fields (e.g. acoustic wave, temperature gradient) to agitate the fluid in order to create turbulence. Compared with the two former methods, active mixing could gain better mixing performance, but obtaining control over the moving component may be a challenge.

Figure 19:
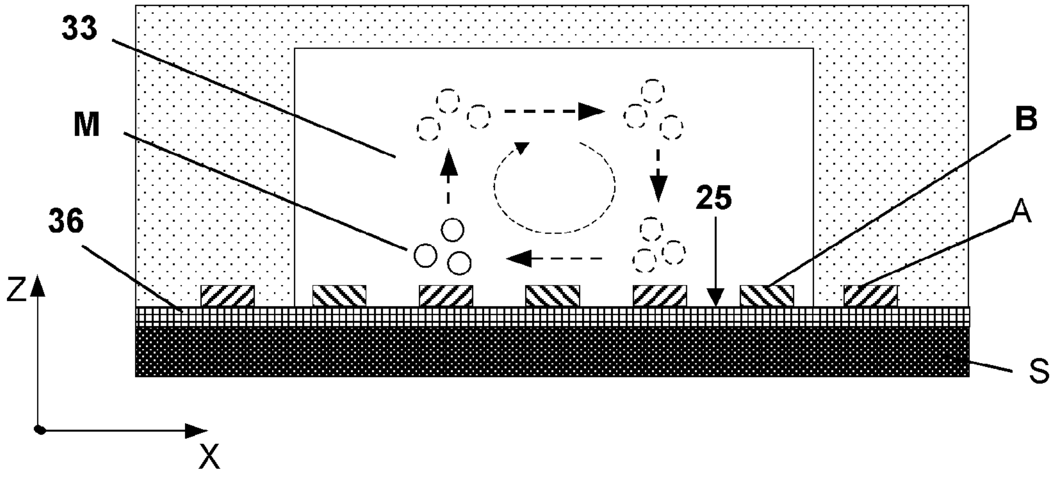
FIG. 19 illustrates active mixing by combination of magnetophoresis and dielectrophoresis.

With the combined MAP and DEP method according to preferred embodiments, active mixing can be performed in a controlled way. The separation distance can be adjusted by changing the relative strength of the magnetic force and negative DEP force, and at the same time the magnetic particles M can be transported in-plane by the traveling magnetic field. This is illustrated in FIG. 19. A turbulence may be created by moving the magnetic particles M along a path shown by the arrows in the figure. Magnetic particles M flow in a channel 33. The conductors A and B may be located on a sensor layer 36. The fluid flows in a direction Y in the channel 33. By moving the particles in both X and Z direction by respectively applying suitable MAP and DEP forces, similar as described above, a turbulent flow may be created in the X-Z plane in the channel 33, as indicated by the arrows in FIG. 19. The turbulent flow gives most target bio-analytes a chance to reach the detection surface 25. This is because when the target analytes do not bind to the detector surface 25 when they first reach it, they can bind to it the next time they are directed towards the detection surface 25 because of the turbulent flow. This increases binding possibility of the target bio-analytes 24 to the detection surface 25 and thus increases the sensitivity of the sensor device as more target bio-analytes 24 will be able to reach the detection surface 25 and thus more target bio-analytes 24 will be detected by the sensor layer 36. In other words, the device may have a lower detection limit while still having a high detection efficiency.

Figure 20:
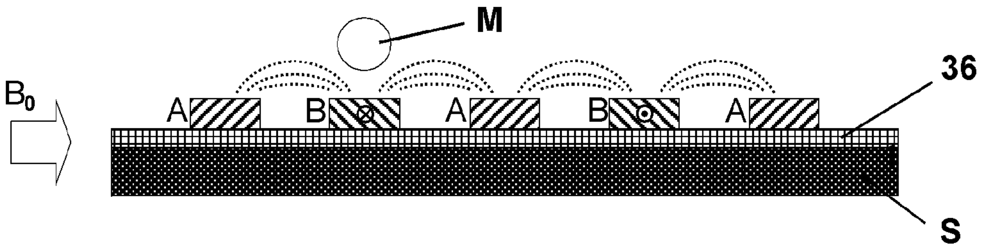
FIG. 20 illustrates the general concept of detecting bioanalytes using various biosensors according to preferred embodiments.

In the above-described embodiment, combined MAP and DEP is further combined with integrated magnetic sensing. According to these embodiments, apart from the combined MAP and DEP actuation principle, the sensing function may be integrated in the device as e.g. a sensing layer 38 in the substrate S as shown in FIG. 19. The actuation principle for the device of FIG. 19 is illustrated in FIG. 20 and is similar to the actuation principle described for the device illustrated in FIG. 3. According to the present example, while the magnetic particle bound bio-analyte is moved by MAP and DEP forces as already described above, the presence of the magnetic particle M may be detected by the sensor layer 36. For this purpose, at least one sensor may be present in the sensing layer 36. Detection of the magnetic particles M may be done by making use of different physical properties of the magnetic particle M. In view of this, according to preferred embodiments, the at least one sensor may be one of:

(a) An optical sensor which detects an optical signal generated by the magnetic particle M, a non-magnetic particle or even the bio-analyte itself. For example, the optical detector may detect a specific absorption rate of the bio-analyte, or it may detect a plasmonic signal when the magnetic particle M or magnetic particle bound bio-analytes is irradiated with radiation of a certain wavelength.

(b) A thermal detector. The thermal detector may detect the magnetic particle M or magnetic particle bound bio-analytes by measuring a temperature change of the magnetic particle M or the particle-analyte complex when they are energized by excitation radiation or electromagnetic fields.

(c) An electrical impedance sensor which may measure an impedance change when the magnetic particles M carry the bio-analyte over the sensor.

(d) An electrochemical sensor which may measure fluctuation of pH, ionic strength or concentration of specific chemicals in a medium, when the magnetic particles bound bio-analytes pass by.

(e) A magnetic sensor. For this purpose, at least part of at least one of the set of conductors A, B, C may be adapted so as to function as a magnetic sensor. Magnetic sensors are able to detect the presence of the magnetic particles M or particle-analyte complexes when the magnetic particles M or the particle-analyte complexes are in the vicinity of the sensors.

Figure 21:
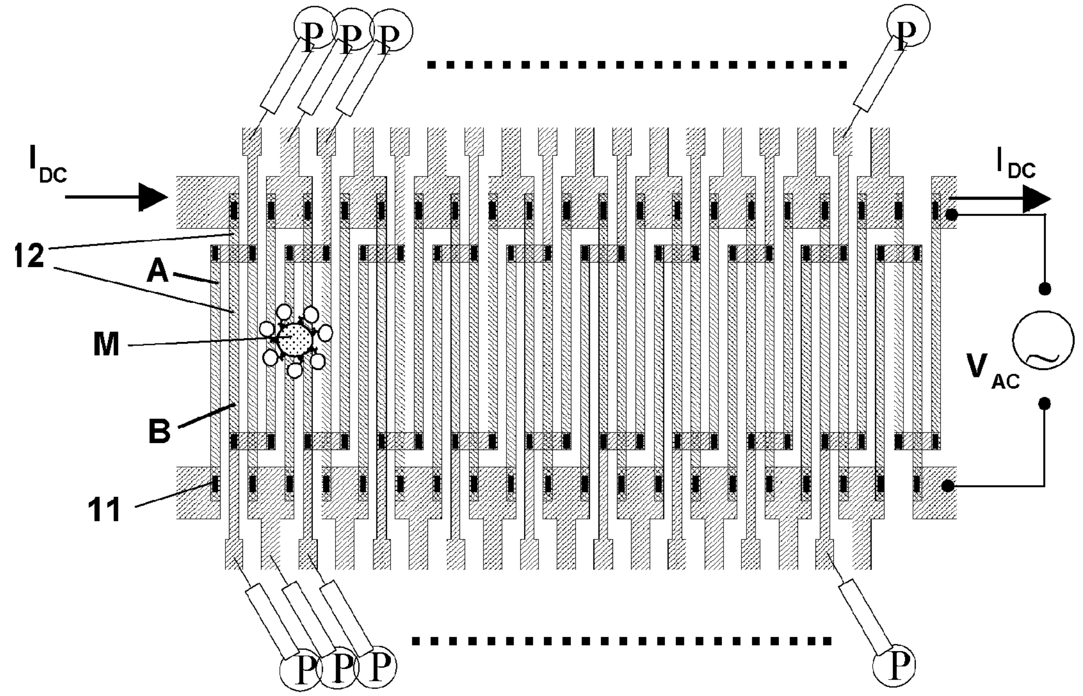
FIG. 21 illustrates the use of magnetic sensors according to preferred embodiments for generating a travelling magnetic field and negative dielectrophoresis and sensing the magnetic particle at the same time.

A possible lay-out of a device in which at least part of at least one conductor of the set of conductors is used as a magnetic sensor is illustrated in FIG. 21. The substantially parallel lines L of the meanders A and B now form parallel magnetic sensors 12 which are electrically connected in tandem to the conductors A and B. For every sensor 12, both ends of the sensor 12 will be electrically connected to the near end of a neighbor sensor 12 of the same conductor A or B. Compared with the device layout in FIG. 3, the major part of both meandering conductors A and B has been replaced with magnetic sensors 12. The magnetic sensors 12 are formed in a first metal layer 9. For this purpose, the first metal layer 9 may now be located closest to the top of the device, i.e. closest to the sample fluid, with respect to the second metal layer 10. This is because the magnetic sensors 12 preferably are located as close as possible to the sample fluid so as to be able to detect the magnetic particles M. Hence, in the configuration of FIG. 21, when compared to the configuration of FIG. 3, the up-down position of the metal layers 9, 10 is now reversed, i.e. the parts of a conductor A or B that overlap with the other conductor B or A is formed in a second metal layer 10 which is located lower in the substrate S than the first metal layer 9 in which the magnetic sensors 12 are formed. Or in other words, the second metal layer 10 is now further away from the sample fluid than the first metal layer 9. Similar to the previous embodiments, different parts of one conductor A or B formed in different metal layers 9, 10 are connected through vias 11.

Magnetic sensors 12 may be used to sense a magnetic field. The magnetic sensor 12 may be a magneto-resistive sensor, including giant magneto-resistive (GMR) sensor, spin valve, tunneling magneto-resistive (TMR) sensor. It may also be any other type of magnetic sensors, such as e.g. a hall sensor. Taking the spin-valve sensor as an example, a typical spin-valve sensor comprises a plurality of metal layers with one non-magnetic layer coupled by two magnetic layers which are respectively referred to as free layer and fixed layer. The magnetization of the free layer is determined by an applied external magnetic field. Due to the different conductivity between parallel and anti-parallel configurations of the free respectively fixed layer, the output resistance of a spin-valve sensor may change if an external magnetic field forces the spin direction of the free layer to rotate. The materials used for a spin-valve sensor may, for example, comprise Ni, Co, Fe, Mn or any other ferromagnetic or ferrimagnetic material and alloys thereof.

When a DC current $I_{DC}$ is switched between the two conductors A and B and an alternating signal $V_{AC}$ is applied across the conductors A and B (see FIG. 21), the traveling magnetic field and AC electric field are established in the same way as discussed for example in FIG. 3. According to the embodiment illustrated in FIG. 21, each magnetic sensor 12 may furthermore comprise a probe P across it. Using these probes P across each of the sensors 12, it may be possible to measure the voltage of each sensor 12.

Taking a magneto-resistive sensor as an example, when a magnetized magnetic particle M passes over the sensor 12, a stray field generated by the magnetic particle 12 can be collected by the sensor 12 which resistivity hereby changes. Thus, when a constant DC current $I_{DC}$ is sent through the conductor A or B, by measuring the voltage across each sensor 12, it is possible to know whether or not a magnetic particle M passes by or binds to the detection surface 25 of the device by evaluating changes in the measured voltage. In this sense, the magnetic sensor array can serve as a detector 12 for magnetic particles labeled bio-analytes.

All types of sensors as described above may be used with the combined MAP and DEP actuation according to preferred embodiments and are able to detect the presence and/or concentration of target bio-analytes in a sample fluid. If the detector 12, e.g. sensor, is capable of reporting the position of the target bio-analyte in real time, the detector 12, e.g. sensor, may be used as a feedback component for closed-loop control of bio-analyte movement.

In a further implementation of magnetic particle manipulation, the combined MAP and DEP actuation principle may be used for sample enrichment.

As state-of-the-art biosensors are becoming more and more sensitive, recently scientists have considered that the detection limit of state-of-the-art biosensors will no longer be determined by the sensitivity of sensors, but instead the amount of analytes that can reach the sensor in an acceptable period of time. In other words, independent of the sensitivity of the sensor, the sensor is not able to give any signal if there are no or substantially no analytes reaching it. Although microsystems have increased the reaction surface to volume ratio to a great extent, the time the analytes need to diffuse toward the detection surface 25 and detector 12, e.g. sensor, may still be too long for practical applications.

As a solution it may be possible to use magnetic particles M in combination with movements induced by combined MAP and DEP in order to enrich the bio-analytes. With enrichment of bio-analytes is meant that more bio-analytes are directed towards the detection surface 25 in an acceptable amount of time (e.g. a few minutes to tens of minutes). When only in-plane movement of magnetic particles M is used, the magnetic particles M still suffer from the potential particle-device adhesion in practical biochemical buffers and the efficiency is limited, as the magnetic force applied for the movement is restricted in order to avoid the adhesion problem.

The configurations according to the embodiments illustrated in FIGS. 4 and 5 may be used for the purpose of enrichment of bio-analytes.

Figure 22:
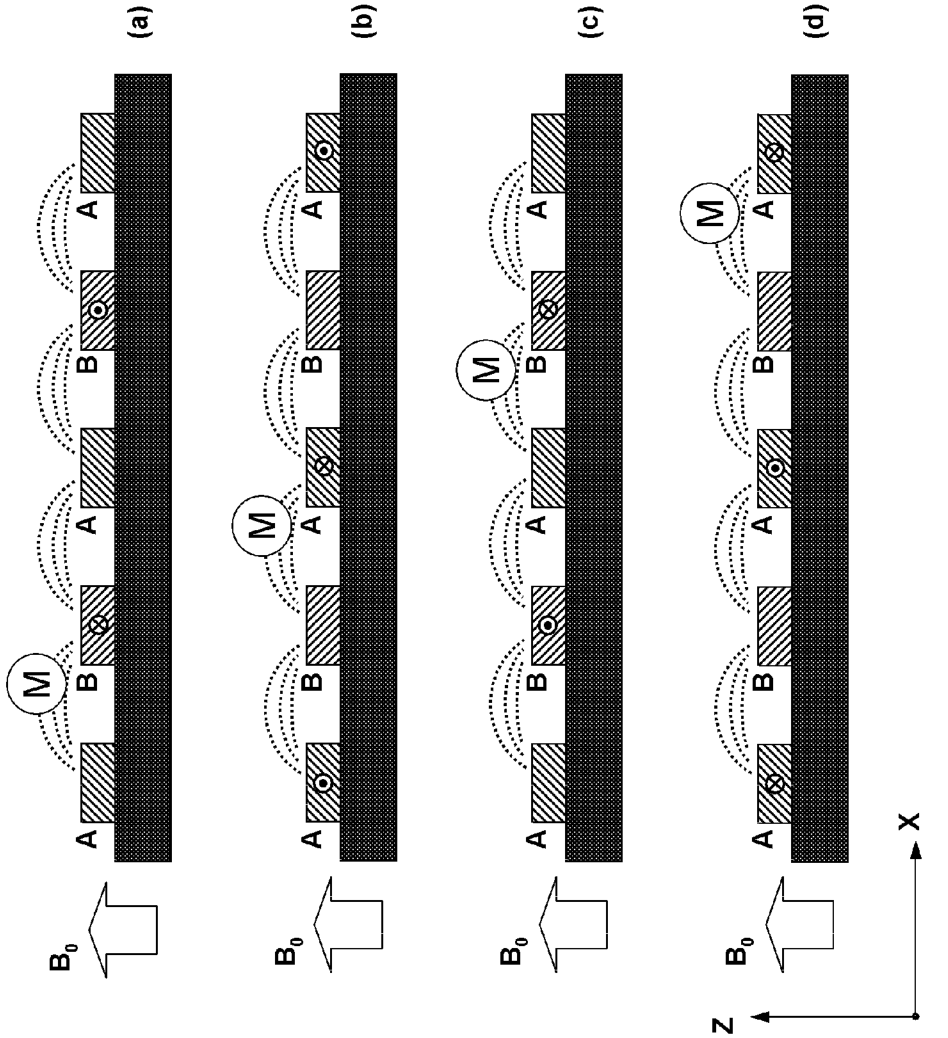
FIGS. 22(*a*)-22(*d*) schematically illustrate the operation principle of a device according to preferred embodiments.

The configuration according to the embodiment illustrated in FIG. 4 comprises a set of conductors which are included in a circular area, the circular area having a center 37 and a border 38. The set of conductors comprises a pair of conductors A and B, each of which is wound in circles from the center 37 to the border 38 of the circular area. The two conductors A and B are electrically insulated from each other by means a dielectric layer in between. Therefore, they can be operated independently. According to the scheme shown in FIG. 22, which operates in a similar way as discussed for the scheme illustrated in FIG. 12 but now for a device with only two conductors A and B, the device may be capable of transporting magnetic particles M from the border 38 to the center 37, for example towards the sensor 12 located in the center 37 of the circular area, as indicated by arrows 39. In this way, magnetic particles M are driven towards the sensor 12 by the MAP forces while being kept close to the detection surface 25 by appropriate DEP forces. Hence, sensitivity of the sensor 12 may be increased because more magnetic particles can reach the sensor 12 in a short amount of time. According to this embodiment, the magnetic particles M may also be moved from the center 37 to the border 38 of the circular area. This may be of importance when, for example, instead of being located in the center 37 of the circular area, sensors 12 would be located at the border 38 of the circular area.

The device shown in FIG. 5 comprises a set of conductors. The set of conductors comprises two pairs of conductors A1, B1 and A2, B2. Each pair of conductors A1, B1 and A2, B2 may be capable of transporting magnetic particles M with the combination of MAP and DEP according to the scheme illustrated in FIG. 7 or FIG. 22. The two pairs of conductors A1, B1 and A2, B2 can be operated independently. They can also be connected externally if necessary. In the middle of the two pairs of conductors A1, B1 and A2, B2, there is a sensor 12 in order to detect the presence of magnetic particles M or the bio-analyte bound to magnetic particles M. By organizing the MAP and DEP forces such that magnetic particles M are driven towards the sensor 12, the sensitivity of the sensor 12 may be increased.

Figure 25:
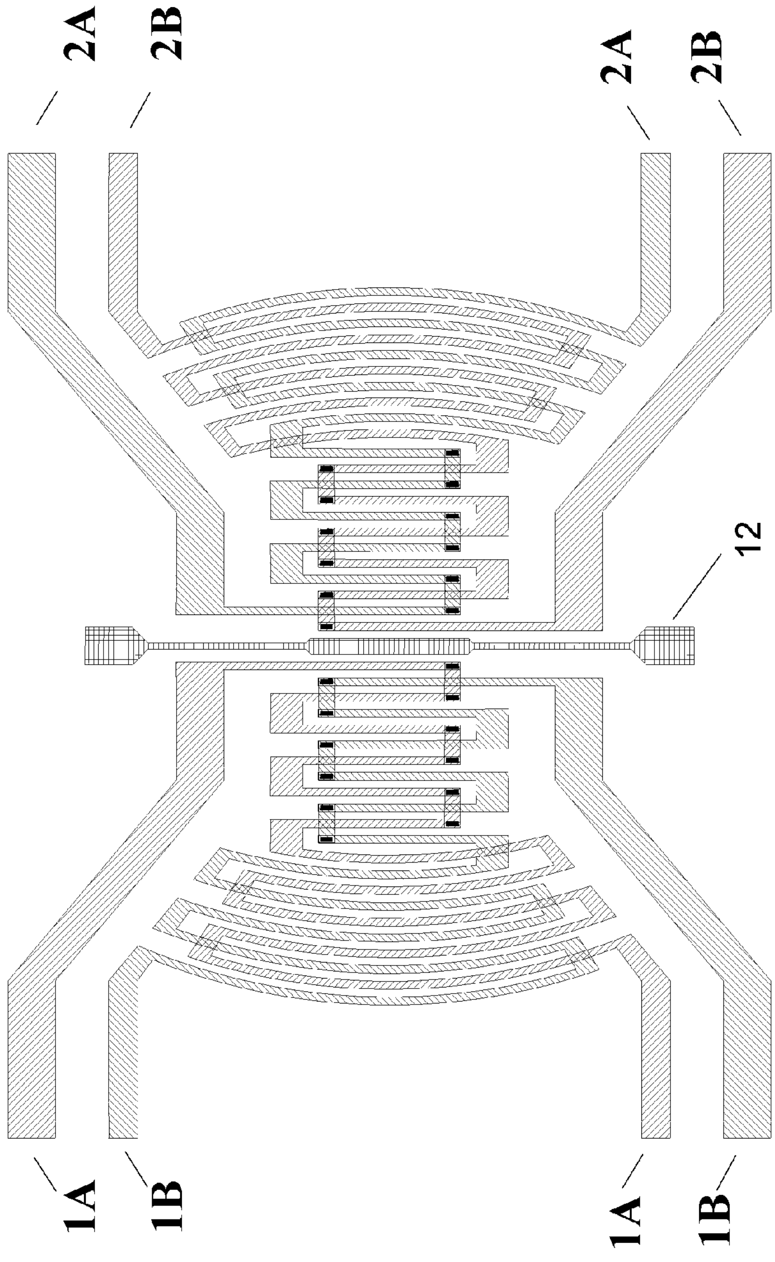
FIG. 25 is a schematic representation of a device according to preferred embodiments.

In the example given in FIG. 25, magnetic particles M may be transported in a similar way as described above toward the detector 12, e.g. sensor, located in the middle of the two pairs of conductors A1, B1 and A2, B2.

The sensors 12 used in the configurations illustrated in FIGS. 4, 5 and 25 may be any type of sensor, such as e.g. a magnetic sensor, an optical sensor, an acoustic sensor, a thermal sensor or an electrochemical sensor.

For the detection of bio-analytes, the binding of magnetic particles M to the bio-analytes should preferably be performed before the mixture is applied to the device. Due to the large surface-volume ratio of magnetic particles M, most of the bio-analytes should be captured by the magnetic particles M. Afterward, in devices as represented in FIGS. 4 and 5, the analyte-particle complexes are attracted and transported toward the sensor 12. In this way, the bio-analytes can be driven toward the sensor 12 by the combined transport under MAP and DEP forces. Therefore, the analytes are enriched at the location of the sensor which facilitates detection and enhances the sensitivity of the sensor 12, and thus of the device.

In some cases, there may be much more magnetic particles M than target bio-analytes. In these cases, the excessive magnetic particles M may be removed from the sensor 12 after the bio-recognition reaction, as was discussed before with respect to FIG. 18.

Figure 23:
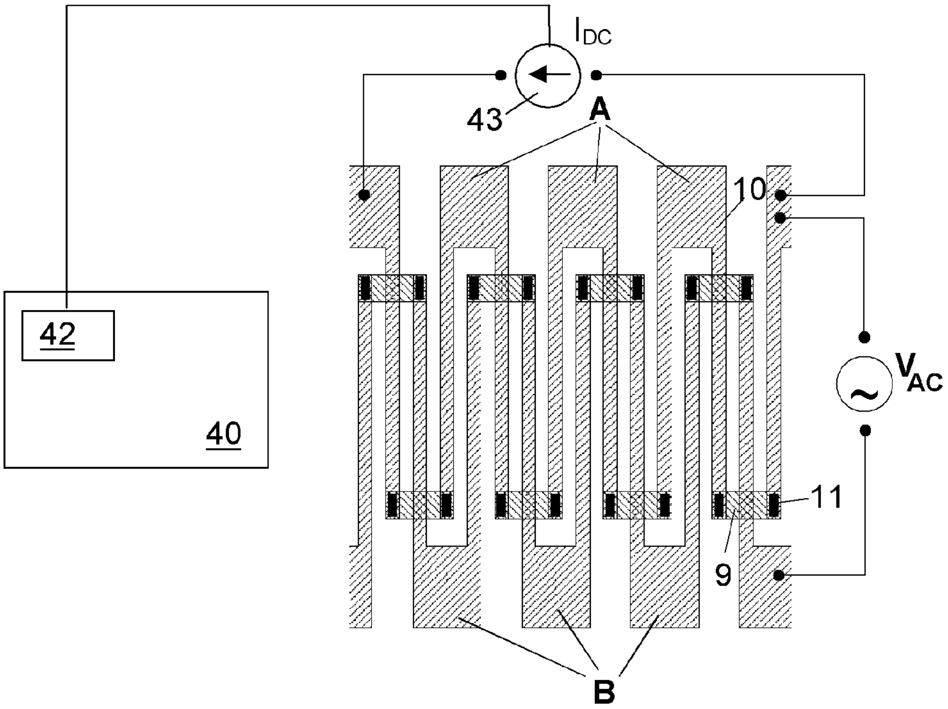
FIG. 23 schematically illustrates a system controller for use with a device according to preferred embodiments.

In a further aspect, the preferred embodiments also provide a system controller 40 for use in a device for manipulating magnetic particles M in a medium according to preferred embodiments. The system controller 40, which is schematically illustrated in FIG. 23, may control the current flow through the conductors (A, B, C) of the device. The system controller 40 according to the present aspect may comprise a control unit 42 for controlling a current source for applying, e.g. alternately applying, a current through conductors (A, B, C) of the device. The current may for example be applied through a current providing unit 43 such as e.g. a plurality of current or voltage sources. Controlling the current to be sent through the conductors (A, B, C) may be performed by providing predetermined or calculated control signals to the current providing unit 43. It is clear for a person skilled in the art that the system controller 40 may comprise other control units for controlling other parts of the device according to preferred embodiments; however, such other control units are not illustrated in FIG. 23.

The system controller 40 may include a computing device, e.g. microprocessor, for instance it may be a micro-controller. In particular, it may include a programmable controller, for instance a programmable digital logic device such as a Programmable Array Logic (PAL), a Programmable Logic Array, a Programmable Gate Array, especially a Field Programmable Gate Array (FPGA). The use of an FPGA allows subsequent programming of the microfluidic system, e.g. by downloading the required settings of the FPGA. The system controller 40 may be operated in accordance with settable parameters.

Figure 24:
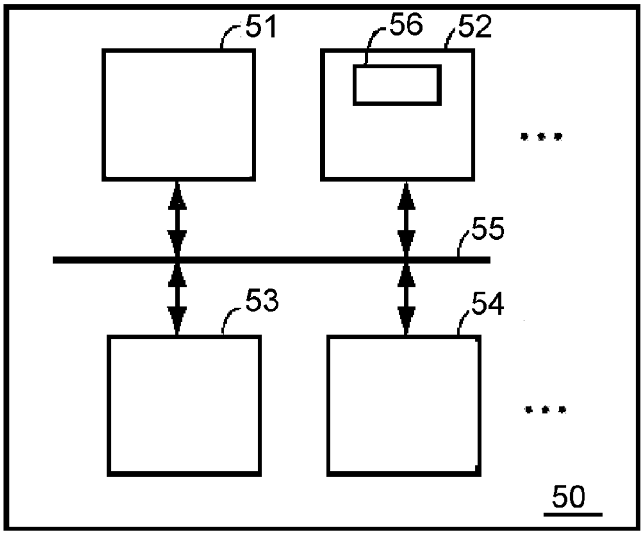
FIG. 24 is a schematic representation of a processing system as can be used for performing the method for manipulating magnetic or magnetizable objects in a medium according to preferred embodiments.

The method for manipulating magnetic particles M in a medium according to preferred embodiments may be implemented in a processing system 50 such as shown in FIG. 24. FIG. 24 shows one configuration of processing system 50 that includes at least one programmable processor 51 coupled to a memory subsystem 52 that includes at least one form of memory, e.g., RAM, ROM, and so forth. It is to be noted that the processor 51 or processors may be a general purpose, or a special purpose processor, and may be for inclusion in a device, e.g., a chip that has other components that perform other functions. Thus, one or more aspects of the preferred embodiments can be implemented in digital electronic circuitry, or in computer hardware, firmware, software, or in combinations of them. The processing system may include a storage subsystem 53 that has at least one disk drive and/or CD-ROM drive and/or DVD drive. In some implementations, a display system, a keyboard, and a pointing device may be included as part of a user interface subsystem 54 to provide for a user to manually input information. Ports for inputting and outputting data, e.g. desired or obtained flow rate, also may be included. More elements such as network connections, interfaces to various devices, and so forth, may be included, but are not illustrated in FIG. 24. The various elements of the processing system 50 may be coupled in various ways, including via a bus subsystem 55 shown in FIG. 24 for simplicity as a single bus, but will be understood to those in the art to include a system of at least one bus. The memory of the memory subsystem 52 may at some time hold part or all (in either case shown as 56) of a set of instructions that when executed on the processing system 50 implement the steps of the method embodiments described herein. Thus, while a processing system 50 such as shown in FIG. 24 is prior art, a system that includes the instructions to implement aspects of the methods for manipulating magnetic particles in a medium is not prior art, and therefore FIG. 24 is not labelled as prior art.

The preferred embodiments also include a computer program product which provides the functionality of the method according to preferred embodiments when executed on a computing device. Such computer program product can be tangibly embodied in a carrier medium carrying machine-readable code for execution by a programmable processor. The preferred embodiments thus relate to a carrier medium carrying a computer program product that, when executed on computing means, provides instructions for executing any of the methods as described above. The term “carrier medium” refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

All references cited herein are incorporated herein by reference in their entirety. To the extent publications and patents or patent applications incorporated by reference contradict the disclosure contained in the specification, the specification is intended to supersede and/or take precedence over any such contradictory material.

The term “comprising” as used herein is synonymous with “including,” “containing,” or “characterized by,” and is inclusive or open-ended and does not exclude additional, unrecited elements or method steps.

All numbers expressing quantities of ingredients, reaction conditions, and so forth used in the specification and claims are to be understood as being modified in all instances by the term “about.” Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A device for manipulating magnetic or magnetizable objects in a medium, the device having a surface lying in a plane and comprising a set of at least two conductors electrically isolated from each other, wherein the at least two conductors are configured to generate a magnetophoresis force to move the magnetic or magnetizable objects over the surface of the device in a direction substantially parallel to the plane of the surface, and to generate a dielectrophoresis force to move the magnetic or magnetizable objects in a direction substantially perpendicular to the plane of the surface.

2. The device of claim 1, wherein the at least two conductors at least partly overlap with each other.

3. The device of claim 2, wherein the at least two conductors comprise a different conductive layer at least at locations where the conductors overlap.

4. The device of claim 3, wherein the conductive layers are located at a different height in a substrate of the device with respect to the surface of the device.

5. The device of claim 1, wherein each of the conductors has a shape of a meander.

6. The device of claim 5, wherein the meander has long lines and short lines configured to connect the long lines, wherein the long lines are substantially parallel to each other and substantially perpendicular to the short lines.

7. The device of claim 1, wherein each of the conductors has a substantially circular shape.

8. The device of claim 1, wherein the at least two conductors comprise a material selected from the group consisting of Cu, Al, Au, Pt, Ti, and alloys thereof.

9. The device of claim 1, wherein at least a part of at least one conductor comprises a magnetic material.

10. The device of claim 1, wherein the device further comprises at least one detector configured to perform at least one of detecting a presence of magnetic or magnetizable objects in a medium and determining a concentration of magnetic or magnetizable objects in a medium.

11. The device of claim 10, wherein the at least one detector is a sensor and is selected from the group consisting of an optical sensor, an electrical sensor, a chemical sensor, a thermal sensor, an acoustic sensor, and a magnetic sensor.

12. The device of claim 10, wherein the at least one detector is part of a feedback loop configured to control transport of the magnetic or magnetizable objects using at least one signal recorded by the at least one detector.

13. The device of claim 1, wherein the magnetic or magnetizable objects are magnetic particles and comprise a material selected from the group consisting of Fe, Co, Ni, Mn, oxides thereof, and alloys thereof.

14. The device of claim 1, wherein the magnetic or magnetizable objects are biochemically functionalized to bind at least one target bio-analyte.

15. The device of claim 1, wherein the device further comprises a bio-functionalized layer on the surface to bind at least one target bio-analyte.

16. A method comprising the step of using the device of claim 1 to perform at least one of detecting a presence of at least one bio-analyte in a sample fluid and determining a concentration of at least one bio-analyte in a sample fluid.

17. A method for manipulating magnetic or magnetizable objects in a medium, the method comprising:

providing a medium comprising magnetic or magnetizable objects to a device having a surface, the device comprising a set of at least two conductors electrically isolated from each other;

applying a DC-current through each of the at least two conductors whereby a magnetophoresis force is generated to move the magnetic or magnetizable objects over the surface of the device in a direction substantially parallel to a plane of the surface; and simultaneously applying an AC-voltage across the at least two conductors, whereby a dielectrophoresis force is generated to move the magnetic or magnetizable objects in a direction substantially perpendicular to the plane of the surface.

18. The method of claim 17, wherein applying a DC-current through each of the at least two conductors whereby a magnetophoresis force is generated comprises alternately applying a DC-current through each of the at least two conductors.

19. The method of claim 18, wherein the device comprises a set of a first conductor and a second conductor, wherein the first conductor and the second conductor at least partially overlap each other, and wherein alternately sending a DC-current through each of the at least two conductors is performed by:

a. applying a DC current to the first conductor in a first direction; thereafter b. applying a DC current to the second conductor in the first direction; thereafter c. applying a DC current to the first conductor in a second direction opposite to the first direction; and thereafter d. applying a DC current to the second conductor in the second direction opposite to the first direction.

20. The method of claim 19, further comprising repeating steps a to d at least once.

21. The method of claim 17, wherein the medium comprises different types of magnetic or magnetizable objects, and wherein the method further comprises separating the different types of magnetic or magnetizable particles from each other.

22. The method of claim 17, wherein the device further comprises at least one detector, wherein the method further comprises performing at least one of detecting a presence of the magnetic or magnetizable objects using the at least one detector and determining a concentration of the magnetic or magnetizable objects using the at least one detector.

23. The method of claim 22, further comprising, after detecting the presence of the magnetic or magnetizable objects, sending at least one signal recorded by the at least one detector to a feedback loop configured to control transport of the magnetic or magnetizable objects.

24. The method of claim 17, further comprising chemically or physically binding the magnetic or magnetizable objects to at least one bio-analyte to be detected.

25. The method of claim 17, further comprising applying an external magnetic field.

* * * * *

UNITED STATES PATENT AND TRADEMARK OFFICE

CERTIFICATE OF CORRECTION

PATENT NO. : 8,409,415 B2
APPLICATION NO. : 11/844171
DATED : April 2, 2013
INVENTOR(S) : Liu et al.

It is certified that error appears in the above-identified patent and that said Letters Patent is hereby corrected as shown below:

On the title page, item (54) and in the specification, column 1, line 2, Title, change "USING" to --USING COMBINED--.

Signed and Sealed this
Twenty-second Day of October, 2013

Teresa Stanek Rea
*Deputy Director of the United States Patent and Trademark Office*